United States Patent
Davidson et al.

(10) Patent No.: US 12,355,237 B2
(45) Date of Patent: Jul. 8, 2025

(54) LOW-LEVEL COMMUNICATION BETWEEN ENERGY PROSUMERS IN A DC MICROGRID

(71) Applicant: University of South Carolina, Columbia, SC (US)

(72) Inventors: Matthew T. Davidson, Columbia, SC (US); Michelle L. Hunt, Columbia, SC (US); Andrea Benigni, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 17/619,717

(22) PCT Filed: Jun. 25, 2020

(86) PCT No.: PCT/US2020/039491
§ 371 (c)(1),
(2) Date: Dec. 16, 2021

(87) PCT Pub. No.: WO2020/264074
PCT Pub. Date: Dec. 30, 2020

(65) Prior Publication Data
US 2022/0320896 A1    Oct. 6, 2022

Related U.S. Application Data

(60) Provisional application No. 62/867,940, filed on Jun. 28, 2019.

(51) Int. Cl.
*H02J 13/00* (2006.01)
*H02J 1/08* (2006.01)

(52) U.S. Cl.
CPC ........ *H02J 13/00009* (2020.01); *H02J 1/082* (2020.01)

(58) Field of Classification Search
CPC ................. H02J 13/00009; H02J 1/082; H02J 13/00007; H04L 27/106
(Continued)

(56) References Cited

U.S. PATENT DOCUMENTS

2004/0207263 A1\* 10/2004 Yanagida ............ H04L 12/4013
307/10.1
2015/0229458 A1\* 8/2015 Vedantham ............ H04B 3/544
375/238

FOREIGN PATENT DOCUMENTS

EP    2451043    5/2012

OTHER PUBLICATIONS

David J. Perreault, et al., Frequency-Based Current-Sharing Techniques for Paralleled Power Converters, IEEE Transactions on Power Electronics, Inst. of Electrical and Electronics Engineers, USA, vol. 13, No. 4, Jul. 1, 1998.
(Continued)

*Primary Examiner* — Richard Tan
(74) *Attorney, Agent, or Firm* — Offit Kurman; Douglas L. Lineberry

(57) ABSTRACT

The present invention relates to sinusoidal components representative of particular commands ($V_{CMD}$) or values, or a combination thereof, superimposed on DC power lines ($V_{DC}$) as a means of communication between the prosumers wherein the communication will be tailored to commands for microgrids.

14 Claims, 18 Drawing Sheets

(58) Field of Classification Search
USPC .......................................................... 307/140
See application file for complete search history.

(56) References Cited

OTHER PUBLICATIONS

Tuladhar, et al., A Novel Control Technique to Operate DC/DC Converters in Parallel with No Control Interconnections, Power Electronics Specialists Conf. 1998, PESC 98 Record 29th Annual IEEE Fukuoka, Japan, May 17-22, 1998, New York, NY USA IEEE, vol. 1, pp. 892-898, May 17, 1998.

Matthew Davidson, et al., Low Frequency Injection as a Method of Low-Level DC Microgrid Communication, Energies, vol. 13, No. 10, May 13, 2020.

* cited by examiner

LOW-LEVEL COMMUNICATION BETWEEN ENERGY PROSUMERS IN A DC MICROGRID

BACKGROUND OF THE INVENTION

1) Field of the Invention

The present invention relates to sinusoidal components representative of particular commands ($V_{CMD}$) or values, or a combination thereof, superimposed on DC power lines ($V_{DC}$) as a means of communication between the prosumers wherein the communication will be tailored to commands for microgrids, including systems and methods for accomplishing same.

2) Description of Related Art

In the case of a microgrid, any connected device, defined as the prosumers, has taken on the role to both consume and produce energy. In fact, the increasing use of renewable energy and local storage has increased the opportunity for prosumers to export energy back to the grid. Furthermore, the optimized utilization of energy within the microgrid may rely on the cooperation of all renewable and storage sources of the entire microgrid.

Accordingly, it is an object of the present invention to provide a basic form of communication in order for this management to occur. The current disclosure provides a method intended to be simplistic with minimal additional hardware, where software is the main customization path, and use a microgrid's existing infrastructure via interfacing or injecting low frequency components to control various parameters of the microgrid. This control will enable simple and effective low-level communication between the energy prosumers of a microgrid without the high overhead of other communication methods.

BRIEF SUMMARY OF THE INVENTION

The above objectives are accomplished according to the present invention by providing in a first embodiment, a low-level unidirectional global communication method for DC microgrids that may include injecting at least one sinusoidal component into DC microgrid power lines, relating at least one parameter and at least one command with frequency components, including at least one communication structure for at least one communication protocol, providing a detection method for detecting the at least one injected sinusoidal component, and all without requiring hardware modification to the DC microgrid. Further, the method may include adding encoding and decoding software. Yet still, the at least one sinusoidal component may encode information in spectra of the at least one sinusoidal component. Again, amplitude of the at least one sinusoidal component may be detected by connected devices engaged with the DC microgrid power lines. Still yet, a frequency range of the at least one sinusoidal component may be rejected by a converter engaged with the DC microgrid power lines. Further again, the method may function in extremely low and super low frequency bands and below. Still again, communication may be unidirectional. Yet further, detection of the at least one sinusoidal component may occur via a second order generalized integrator phase locked loop in conjunction with at least one infinite impulse response bandpass filter. Yet still, latency may be 50-500 ms and/or 2-20 cps. Still again further, comprising channel separation may expand a number of commands. Furthermore, channel separation, may be achieved via a multi-level voltage structure. Still yet, commands may be either layered or packet-based. Again yet, a single tone detection method may be provided.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
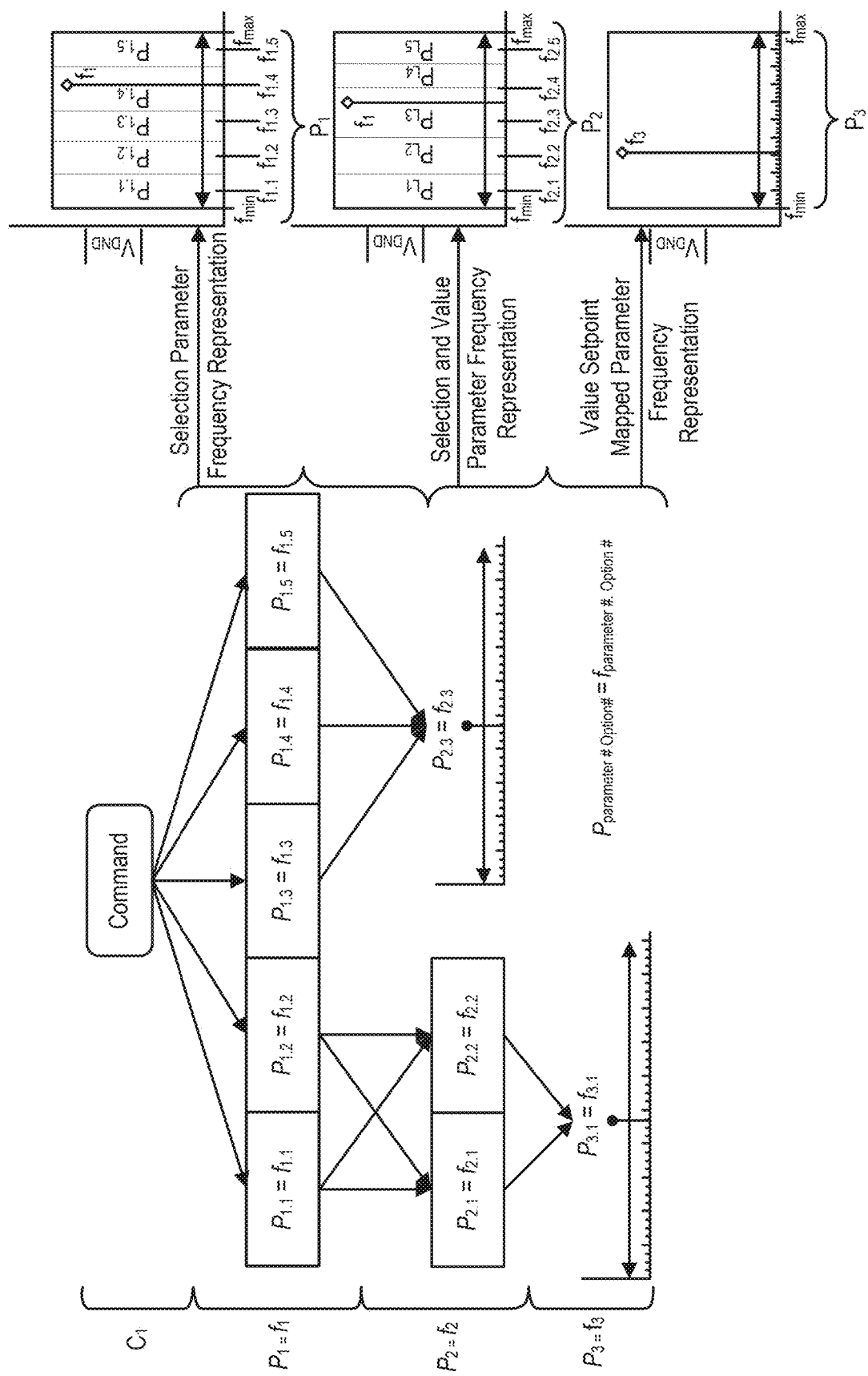
FIG. 1 illustrates a diagram showing how a command is represented by its continuous and discrete parameters and their respective frequency representation.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The current disclosure provides a communication method between prosumers of energy connected to a DC microgrid; prosumers meaning any device that can absorb or inject energy. This is achieved through low frequency sinusoidal components which are superimposed on the DC distribution lines of a DC microgrid to serve as a form of low-level communication.

The low frequency components make up a command (or commands) in the form of parameters, where each parameter is represented by a particular frequency component. The commands and or parameters occupy some frequency space depending on the method of communication used. Multiple or single frequencies from the communication method may exist at one time.

This method may utilize the following to transmit these low frequency signals: superimposition on voltage of microgrid, superimposition on current of microgrid, or specifically using individual rails of a multi-level voltage structured distribution lines.

The current disclosure allows devices connected to a DC microgrid to communicate with each other including, but not limited to, houses and energy sources. This allows basic parameters of the connected devices to be altered based on the controlling device. This method allows use of already existing hardware with some software modification therefore being a relatively simple method to implement and of low-cost to use. This communication method allows easier control between connected devices using the existing power connection. This could enable higher bandwidth functions such as current sharing between devices and utilization of local storage and renewables. This style of communication allows an easy way to optimize parameters of a DC microgrid via connected devices (prosumers).

In one aspect, this communication method may be used with high voltage (hundreds of volts) and long distances (several kilometers) using the already existing DC distribution lines (power lines) and existing power electronics (or devices) connected to it. The only modification would be the software of the connected devices/power-electronics, which would be a low-overhead addition. The simplicity of communication and integration is what makes this unique. The physical connection of this communication style is also extremely robust as it reuses the power connection.

Sinusoidal components representative of particular commands ($V_{CMD}$) or values, or a combination thereof, are superimposed on the DC power lines ($V_{DC}$), see (1) infra, as a means of communication between the prosumers. These commands or values are parameters to be controlled that may only have either binary values (i.e. enabling/disabling signals), a case-like structure, sub-parameters, or a representation of some numeric value or rate of change. This type of communication will be best suited for global commands of the microgrid however, individual addressing of prosumers or communication-based feedback is still a possibility.

$$V_{GRID} = V_{DC} + V_{CMD} \#  \quad (1)$$

To address the feasibility of this type of communication, with regard to maintaining the operability of the microgrid, the requirements are addressed first. From which, the communication methods that can be employed with LFCC are then discussed.

A) Requirements

1) Frequency Range

The choice of which frequencies to use, which will most likely range between [10-200] Hz, are in consideration of the interfacing converters of the DC lines, specifically being the cutoff frequency of the input filters and controller bandwidth as to mitigate any adverse effects on the performance of the control, and any fault detection methods that rely of the rate of change of any values of the grid. The values should also be separated from any expected harmonics/subharmonics that may be produced as a result of the connected devices (e.g., converters or loads). It is also assumed that the properties of the grid (e.g., voltage and current) change very slowly over time. This assumption provides reliability for the communication method since the frequency injection can be assumed to always be over a DC value.

2) Criticality and Feedback

The criticality of the communication is also kept minimal and thus commands are used for optimization or better utilization of resources (i.e. low criticality operational parameters). It is for this reason should any prosumer fail at receiving the command, the stability of the microgrid is not compromised. Furthermore, the throughput to these signals can be assumed to be considerably slow; this assists with low overhead on the computational power of the receiver as well as overall stability. The throughput is intended to mean the duration of a command from Low Frequency Components Communication (LFCC) will exist for some considerable amount of time before another change is initiated. Therefore, for the amount of time a command does exist, the prosumer will have ample time to periodically sample (instead of constantly monitoring) the grid for updates in parameters. This will also allow prosumers multiple chances at receiving the command, thus increasing communication robustness.

To further increase said robustness, a method of feedback may be implemented to indicate a command received, which can be done either explicitly or implicitly. The explicit method would require each prosumer to be individually addressable. Not only does this allow for more independent control, it allows explicit knowledge of which prosumer has and hasn't received the command. In addition, if the sender of the signal can verify all prosumers have received the command, the throughput can increase as well.

In the case that addressing each prosumer becomes cumbersome or unfeasible due to the limited spectrum available, an implicit method can be used. Even though the prosumers are not directly responding, the commands sent from the Community Energy Source (CES) should elicit a response within the operating point of the microgrid—in this way, the feedback of the houses, in general, can be 'observed' where as long as the majority of prosumers respond appropriately (i.e., change whichever operating characteristic), then communication can be considered successful.

There will be situations in which a nefarious or unintended signal exists on the DC bus not produced from the transmitting prosumer but can be registered as a command. If this situation does occur, the transmitting prosumer can detect that this is not an intended command and can take appropriate action to ensure the remaining prosumers do not use it. In addition, a type of patterning (on-off-on) may also help discriminate whether the signal is legitimate. This can be implemented regardless of which feedback method is used.

B) Communication

1) Representation of Commands

In general, for a supposed binary or case signal, the transmitting prosumer would output a signal in the form of a sinusoid superimposed on the DC grid voltage, and receiving prosumer would detect this frequency, where the frequencies and their associated commands are pre-programmed, and initiate the change. In its simplest form, a certain frequency would be associated with that binary signal, see (2) infra.

$$P_{on}=f_1, P_{off}=f_2, P_{case}=f_3, \text{ where } f_1, f_2, f_3 \in [f_{min}, f_{max}] \quad (2)$$

Where $f_1$, $f_2$, and $f_3$ are the chosen frequency components to represent the parameter's on ($P_{on}$), off ($P_{off}$), or case ($P_{case}$) value, respectively, and $f_{min}$ and $f_{max}$ are the chosen minimum and maximum frequencies that Low Frequency Components Communication (LFCC) can exist within.

In addition, there may be cases where parameters may have a numeric representation and the command needs to set a value. For such a command, a method to select the parameter to adjust and its respective value need to be chosen. This type of problem can be expanded to the generic problem of a command containing multiple parameters, those parameters either being a discrete or continuous variable, where each parameter has its own frequency space, see FIG. 1, a diagram showing how a command is represented by its continuous and discrete parameters and their respective frequency representation. For the continuous variables, the frequency value in relation to its window is considered the parameter value (most likely a percentage) whereas the discrete case considers partitions of the window to be the parameter choices. For the discrete case, the receiver will detect which partition this frequency value is in by determining its proximity to the center frequency of each partition.

To implement multi-parameter commands, the following methods will be discussed: sequential frequencies, layered frequencies, or center-layered frequencies. To this end, a two-parameter command consisting of a continuous (numeric) and discrete (base) parameter (consisting of 3 sub-parameters or partitions) are considered for the following methods.

i) Sequential Frequencies

Figure 2:
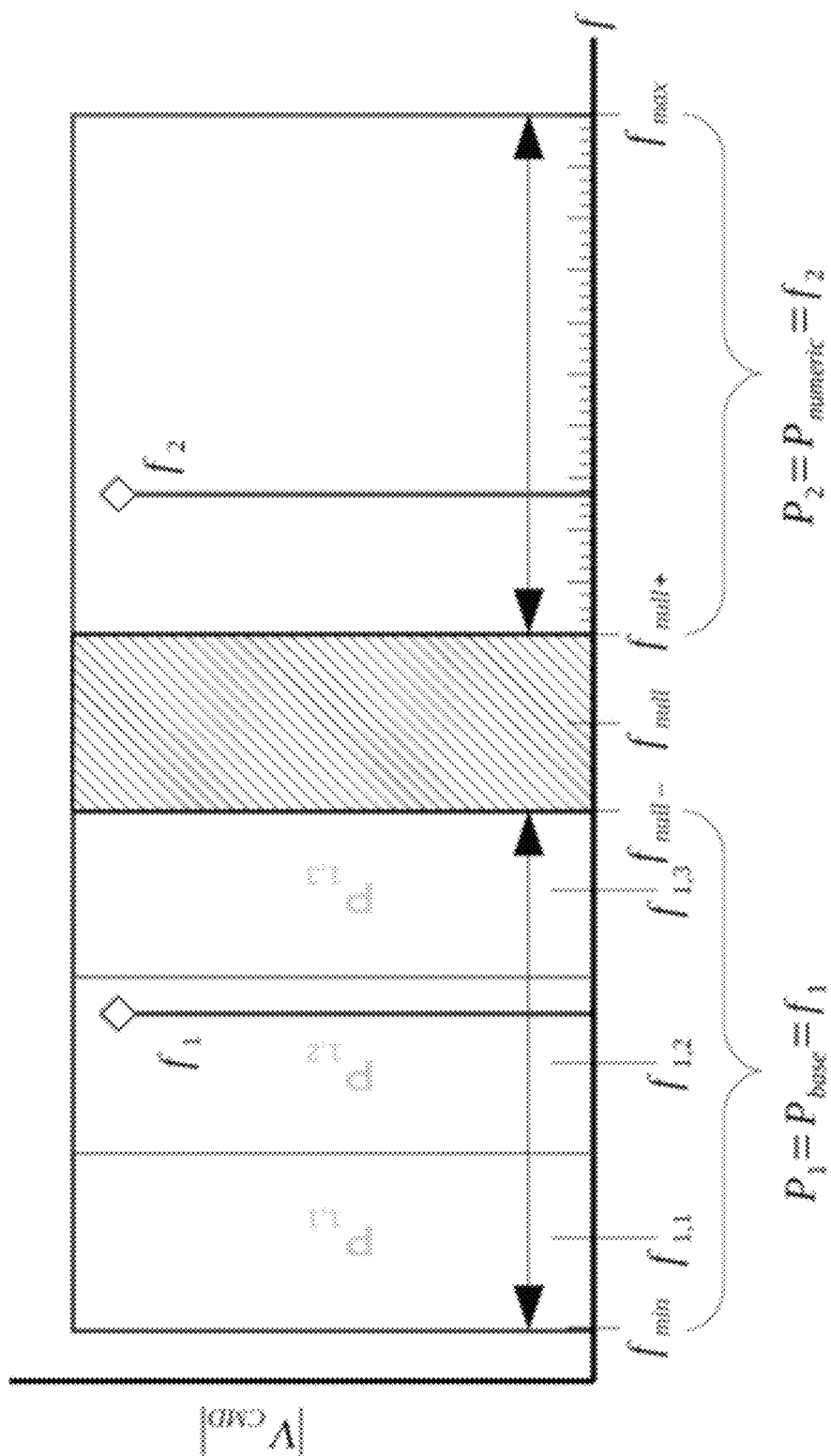
FIG. 2 shows a sequential frequency spectrum separation.

If it is assumed the discrete base parameter takes the lower half of the spectrum and the continuous numeric values take the upper half of the spectrum, the spectrum can be represented as shown by (3), infra, and by FIG. 2.

$$P_1 = P_{base} = f_1 \in [f_{min}, f_{null}], \quad (3)$$

$$P_2 = P_{numerica} = f_2 \in [f_{null+}, f_{max}] \text{ where}$$

$$f_{null} \in [f_{null-}, f_{null+}];$$

$$f_{null-} = f_{null} - \epsilon; f_{null+} = f_{null} + e$$

$$P_{1,1} = P_{base,1} = f_{1,1} = \frac{f_{min} + f_{min+\rho}}{2},$$

$$P_{1,2} = P_{base,2} = f_{1,2} = \frac{f_{min+\rho} + f_{min+2\rho}}{2},$$

$$P_{1,2} = P_{base,2} = f_{1,3} = \frac{f_{min+2\rho} + f_{null-}}{2} \text{ where}$$

$$\rho = \frac{f_{null-} - f_{min}}{m} = \frac{f_{window}}{m}$$

Where $f_{null}$ is the frequency band where no frequencies can exist in order to create zero overlap, and more-so channel separation, between the base parameter frequencies and numeric parameter frequencies. This band is defined by $\epsilon$, which indicates the upper and lower portions of the frequency band centered at $f_{null}$. The null variables $P_1$ and $P_2$ are used to maintain a general nature, where $P_1$ and $P_2$ are the parameters of a single command. The variables $P_{1,1}$, $P_{1,2}$, and $P_{1,3}$ are sub-parameters for $P_1$ and the variable p is a partitioning variable to subdivide the frequency window by m partitions. Note: $P_1$ and $P_2$ are not specific to $P_{base}$ and $P_{numeric}$, as this is only an example; the spectrum is mostly independent of parameter type. This, however, may not be true if the resolution of detection is better at certain parts of the spectrum and that is desirable for one or more parameter types.

Figure 3:
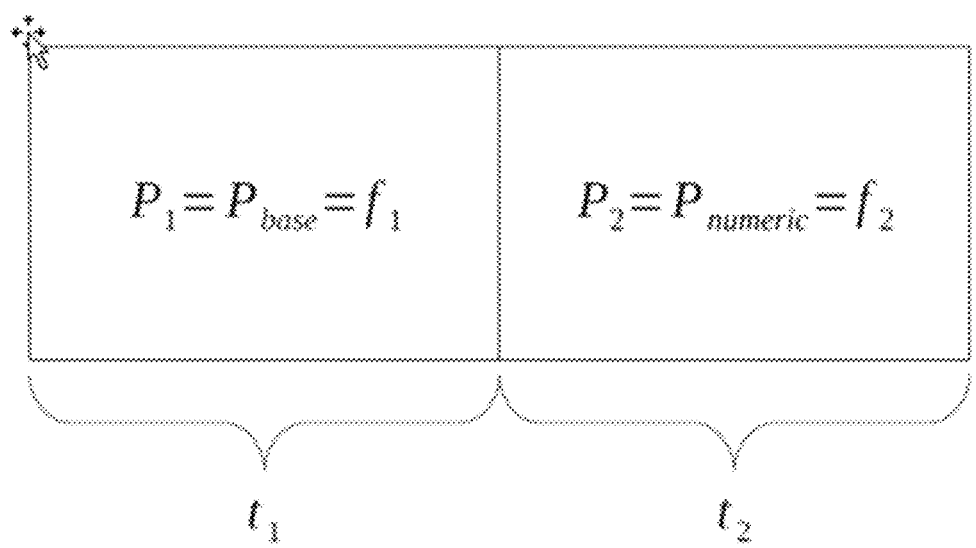
FIG. 3 shows a basic format of sequential frequencies.
Figure 4:
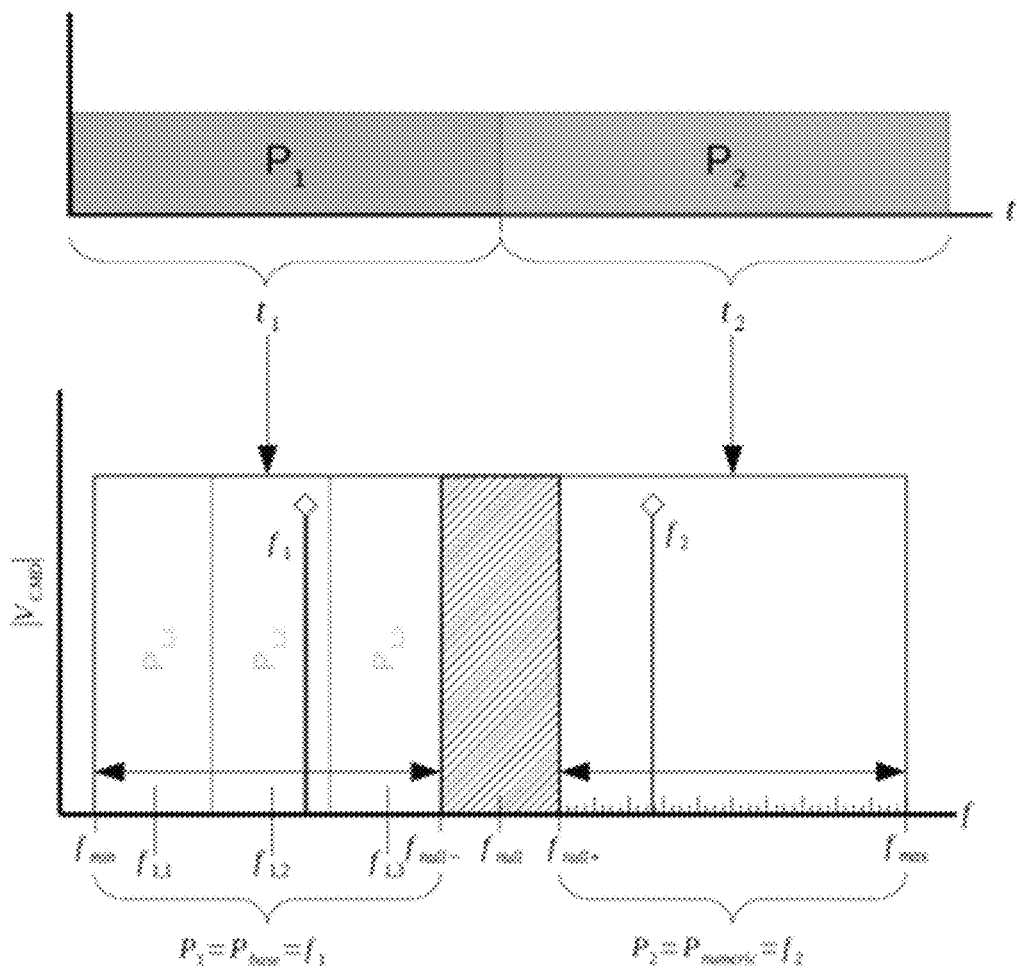
FIG. 4 illustrates a frequency representation for basic format of sequential frequencies.

In order to command this type of signal, $f_1$ will exist for some amount of time ($t_1$) to indicate which base parameter is going to be adjusted and then $f_2$ will exist for some amount of time ($t_2$) to indicate which numeric value to set that specified base parameter to, see FIG. 3, basic format of sequential frequencies, and FIG. 4, frequency representation for basic format of sequential frequencies, and (4), infra.

$$^{\perp}V_{CMD}(t)=\Pi_{0,t_2}(t)A_1 \sin(\omega_1 t)+\Pi_{t_1,t_{1S}}(t)A_2 \sin(\omega_2 t)$$

$$\omega_1=2\pi f_1, \omega_2=2\pi f_2, t_{1,2}=t_1+t_2 \quad (4)$$

Where $V_{CMD}$ is the command voltage to be superimposed over the DC bus, $A_1$ and $A_2$ are each frequency components respective amplitude, and $t_1$ and $t_2$ are the respective signal durations. The Π function is defined as a rectangular function:

$$\Pi_{a,b}(t) = u(t-a) - u(t-b)$$

Where u(t) is the unit step function; this produces a rectangular-shaped pulse of magnitude 1 when a≤t≤b.

Figure 5:
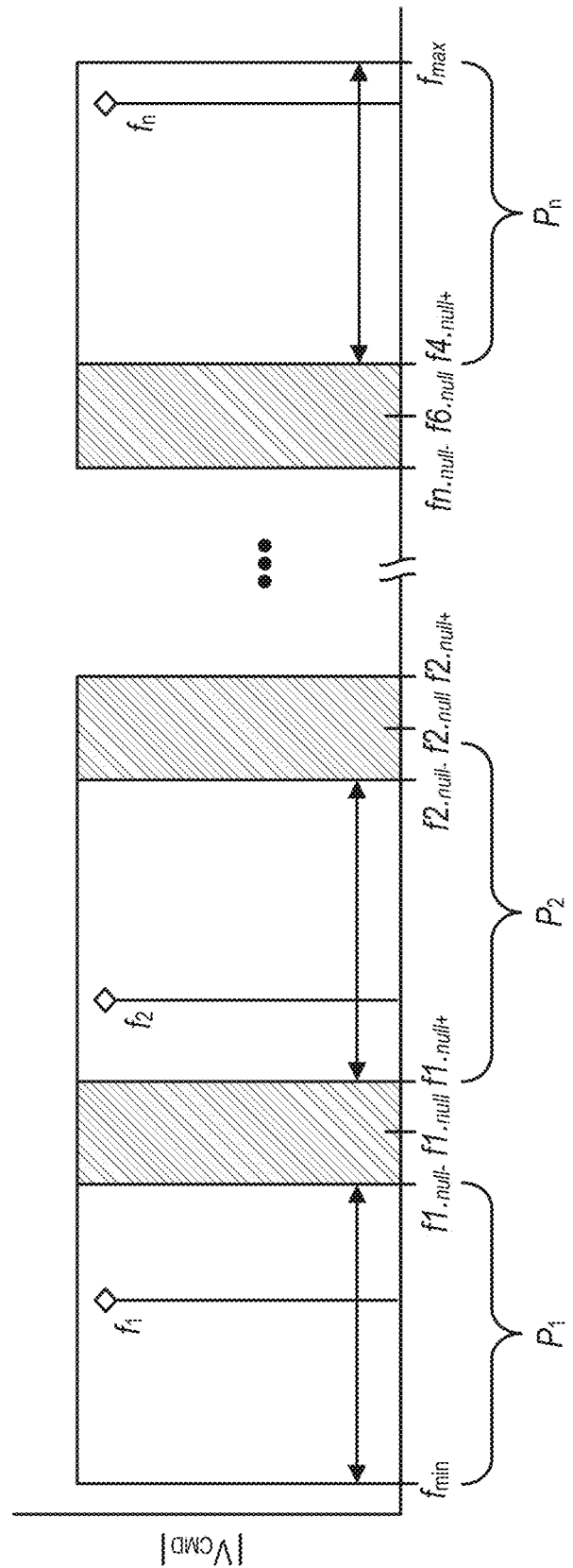
FIG. 5 shows a frequency representation for sequential frequencies for n parameters.

For n parameters, FIG. 2 can expand to FIG. 5, frequency representation for sequential frequencies for n parameters, and (4) will become:

$$V_{CMD}(t) = \Pi_{0,t_1}(t)A_1 \sin(\omega_1 t) + \Pi_{t_1,t_{2,3}}(t)A_2 \sin(\omega_2 t) + \ldots + \Pi_{t_{n-1},t_{n-1,n}}(t)A_n \sin(\omega_n t) \quad (5)$$

where n∈ ℤ⁺

The point of this scheme to is to assign a certain part of the available spectrum to certain portions of a command that is made up of several parameters. Therefore, depending on the number of parameters that make up a command, the spectrum will be divided by the max number of parameters in order to represent that single command (within reason).

Figure 6:
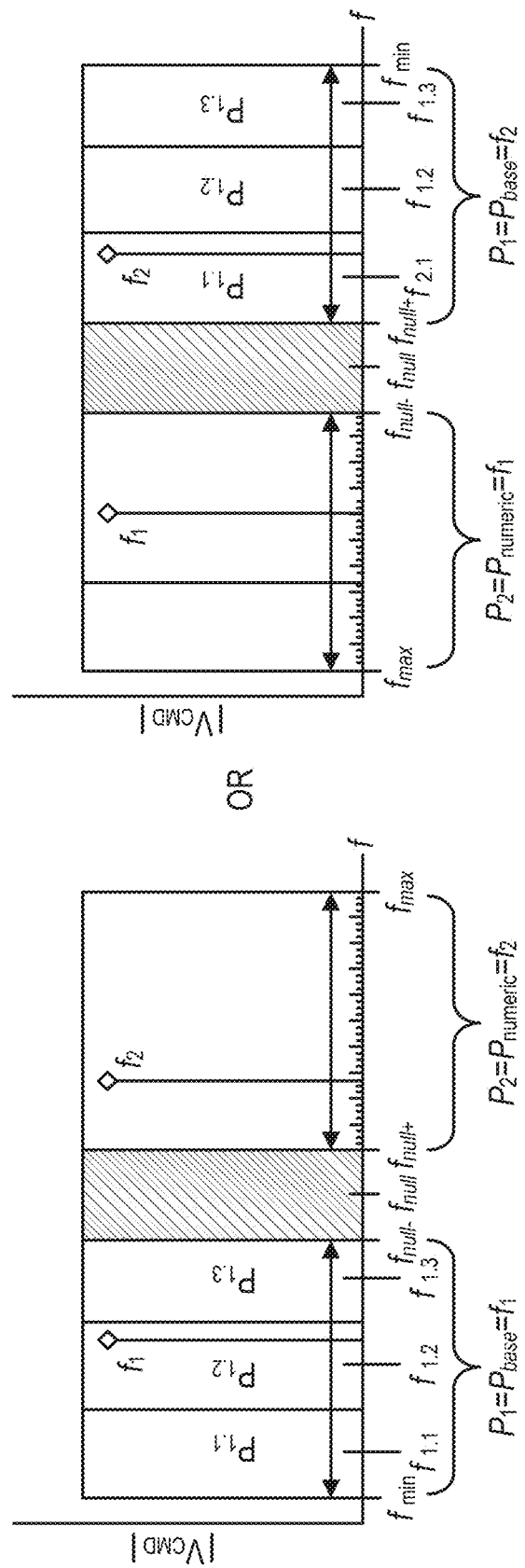
FIG. 6 showing frequency re-use due to order dependent nature.

Since sequential frequencies are by nature order dependent, this implies an advantage of frequency re-use. As shown in FIG. 6, showing frequency re-use due to order dependent nature, with reference to (3), technically the entire spectrum (with exception of $f_{null}$) can be used for both parameters $P_{base}$ and $P_{numeric}$.

Figure 7:
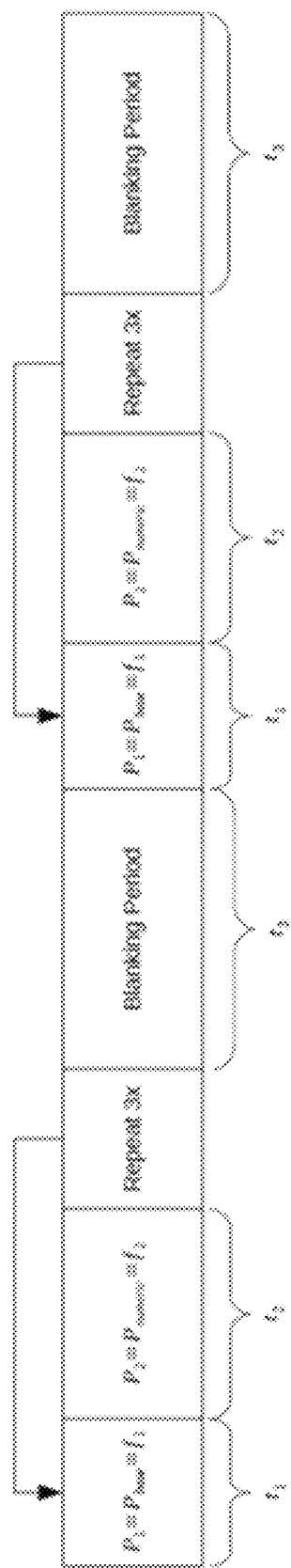
FIG. 7 shows an example of a sequential frequency method.

One potential communication issue is if the prosumer(s) only interpret a part of the signal, this could mean a completely different command. Therefore, a known repeating period is used along with a blanking period (frequency of zero hertz) for duration $t_3$, which can be seen in FIG. 7, example of sequential frequency method, with reference to (3). If the sequential frequency does not follow this format, then the prosumer (or receiver) can assume a missed message. In addition, the time length may also be used to signify which signal came first (lower length of time means the first frequency for example) as a sort of error correction for the receivers.

This method provides a way to communicate complex or multi-parameter commands to prosumers. However, this method can only transmit one command at a time and its throughput is the slowest of all the methods. The advantage of this method comes with its ability of reusing parts of the spectrum due to its order-dependent nature and therefore having the largest available spectrum-to-control ratio. Additionally, the depth or number of parameters for a given command will not realistically be a limiting factor for this method. (Realistically means that in implementation, commands should not have more than four parameters, therefore this presents no issue for this method)

ii) Layered Frequencies

In order to increase the throughput, a layered approach can be used to express the same commands that the sequential frequencies method can all at once. Considering (3) again, instead of outputting these frequencies in a sequence, they are both produced at the same time—hence layered. It is assumed that the effort the receiver would use to detect one frequency can simply be extended for multiple frequencies. This method is similar to FIG. 2 and the spectrum will also be divided by the max number of parameters a command contains (within reason). Now (4) will become:

$$V_{CMD}(t) = A_1 \sin(\omega_1 t) + A_2 \sin(\omega_2 t)$$

$$\omega_1 = 2\pi f_1, \omega_2 = 2\pi f_2 \quad (6)$$

Where now both signals will exist at the same time. This signal can exist until a new command is available or exist for a preset finite time, where the signal must exist on the DC bus for some preset minimum time to allow all prosumers to receive the command.

This technique can also expand the number of signals that can be commanded. If (3) is considered, where a command consists of two parameters, then the available spectrum could be divided into, for example, six allocations to allow three commands to be sent at once. The three command spaces could be divided by non-overlapping commands, that is commands that are necessarily independent of each other, or each command space could be a duplicate of all available commands.

For n parameters, the (6) will expand to:

$$V_{CMD}(t) = A_1 \sin(\omega_1 t) + A_2 \sin(\omega_2 t) + \ldots + A_n \sin(\omega_n t) \quad (7)$$

where n∈ ℤ

The advantage of increased throughput comes at the expense of frequency reuse. However, this method can expand the number of simultaneous commands up to about four and like sequential frequencies, is not realistically limited by the depth or number of parameters for a given command.

iii) Center-Layered Frequencies

Figure 8:
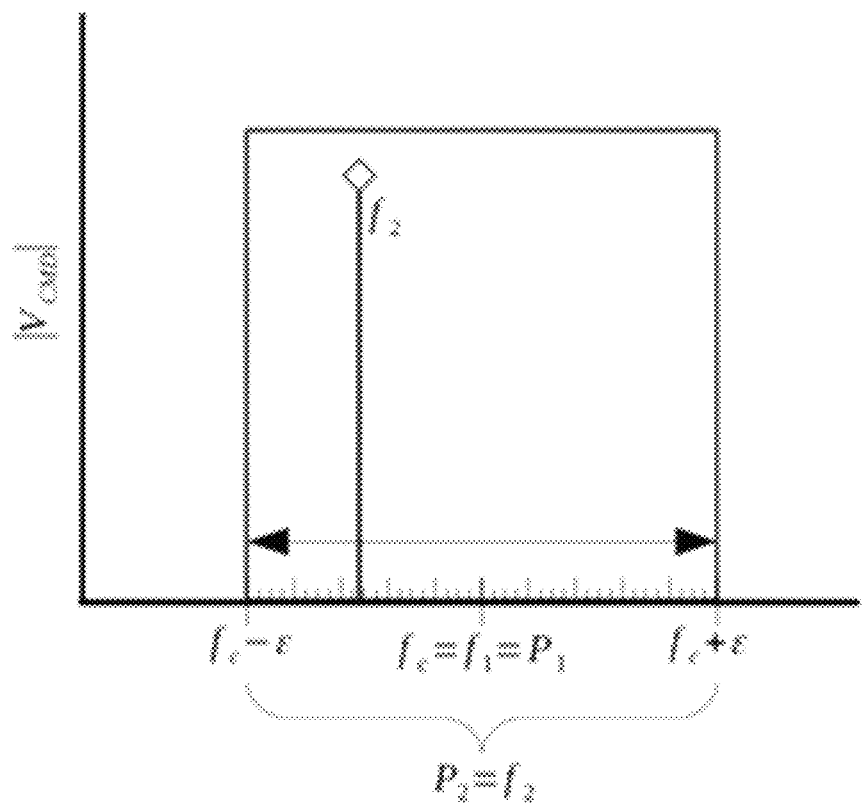
FIG. 8 illustrates a spectrum for a center-layered frequencies method.
Figure 9:
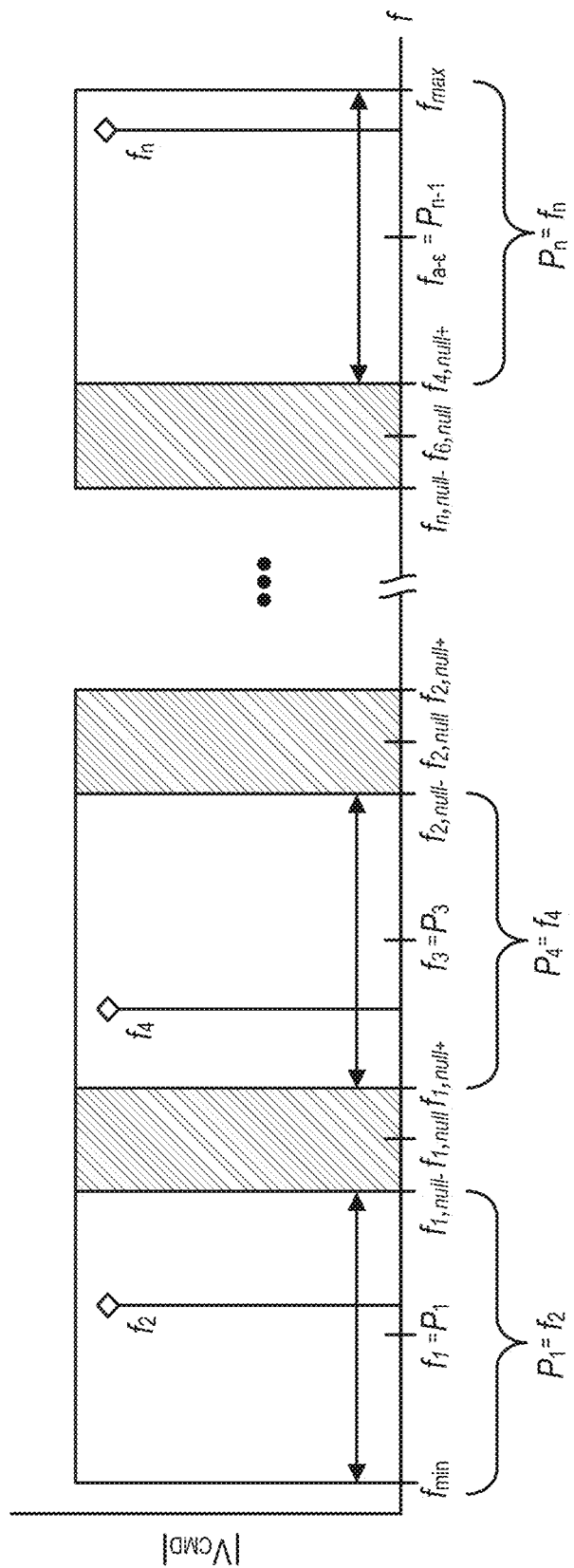
FIG. 9 shows centered-layered frequencies with multiple commands (frequency windows).

To further increase throughput and number of simultaneous commands that can be sent at once, a modification of the layered frequencies technique can be used if a command only contains two parameters. Following (3) again, the base parameter is chosen by a specific frequency, which acts as a center frequency within a frequency window. The frequency value that exists within this window is the numeric parameter (8), see FIG. 8, spectrum for center-layered frequencies method. In other words, the numeric parameter frequency value also determines the base parameter being adjusted by simply examining which frequency window the numeric parameter exists in. Essentially, one frequency value is encoding two parameter values where the frequency window is the command itself. For simultaneous commands, the frequency space of LFCC is separated into the respective frequency spaces with the inclusion of the null frequency windows, FIG. 9, centered-layered frequencies with multiple commands (frequency windows). The numeric frequency parameter will exist for some preset minimum time before changing.

$$P_1 = P_{base} = f_1 = f_c = \frac{f_{c-g} + f_{c+g}}{2}, \quad (8)$$

$$P_2 = P_{numerica} = f_2 \in [f_{c-g}, f_{c+g}]$$

Where $f_c$ is the center frequency of the window, whose upper and lower limits are defined by ε. This can also be used to, instead, specify a rate of change in either the positive direction (frequencies above the center frequency) or negative direction (frequencies below the center frequency) (10).

$$V_{CMD}(t) = A_2 \sin(\omega_{C1} t) + A_2 \sin(\omega_{C2} t)$$

$$\omega_{C1} = 2\pi[\alpha_1(2\varepsilon) + (f_{c1} - \varepsilon)], \omega_{C2} = 2\pi[\alpha_2(2\varepsilon) + (f_{c2} - \varepsilon)],$$
$$\text{where } \alpha_1, \alpha_2 \in [0,1] \quad (9)$$

Where $\omega_{C_n}$ are the specified center-layered frequencies, defined by an adjusting parameter $\alpha_n$, which allows numeric values between 0% and 100% about center frequency $f_{cn}$.

$$V_{CMD}(t) = A_1 \sin(\omega_{CR1}t) + A_2 \sin(\omega_{CR2}t)$$

$$\omega_{CR1} = 2\pi(\alpha_1\varepsilon + f_{C1}), \omega_{CR2} = 2\pi(\alpha_2\varepsilon + f_{C2}), \text{ where } \alpha_1, \alpha_2 \in [-1, 1] \quad (10)$$

Where $\omega_{CRn}$ are the specified rate-based center-layered frequencies, defined by an adjusting parameter $\alpha_n$, which allows both positive and negative change from the center frequency $f_{Cn}$. As before, the frequency band about the center frequency is determined by $\varepsilon$.

In all equations and figures for this section, the frequency windows are assumed to be the same size for simplicity however this does not have to be the case in implementation. For n parameters, (9-10) will appear similar to (7).

This method increases the number of simultaneous commands and throughput at the expense of frequency re-use and the total number of commands that can be used overall. The depth or number of parameters per command must be limited to two. Even so, most commands will most likely only contain two parameters and the ability to control a rate of change may prove to be useful for most commands.

The overall microgrid communication will most likely consist of an amalgamation of multiple types, where the type of command and LFCC communication style are best suited for each other. As stated in the Criticality and Feedback section, the duration (or amount of repetition) will sustain for an extended period of time before the next change to ensure all prosumers have received the signal.

2) Channel Separation

It may also be advantageous to define a type of channel separation where a distinction can be made to further isolate certain signals or certain prosumers (senders/receivers) from others. This has already been seen with both the layered and sequential methods: the layered method can use time (or duration) as a sort of separation to indicate which frequency is the command and signal level/value and sequential uses certain frequency ranges, separated by a null frequency window, to make that same discernment. However, the grid itself can be taken advantage of for this signal isolation.

Up to so far, LFCC has been superimposing a signal on top of the DC voltage, however if it is assumed that the DC grid current value is to be a slow-varying value, then a signal may be superimposed over that as well. This is also taking advantage of the most-likely already existing current and voltage sensors/transducers on the interfacing converters themselves. However, since voltage and current are not dependent terms, this method may be reliant on the control method implemented and may require some sort of decoupling to help the signals be more [statistically] independent.

In a similar fashion, if the grid topology boasts a bi-level voltage structure with a shared or common neutral, then the positive rail could be used to separate signals from the negative rail. This type of separation also assumes that the interfacing converters consist of separate converters for each rail or there exists some method of independent control over each rail.

Similar to the communication methods, multiple methods of channel separation may also be used at the same time.

3) Frequency Detection

In all cases, there needs to be some sort of way to detect the frequency. This will be done utilizing the already existing voltage and current sensors (for feedback control and or for detection/safety reasons). The detection will most likely be done in software on the existing embedded system for the interfacing converter. This opens up the possibility to use DSP techniques for detection or a type of peak counting or triggering method for the frequency magnitude. That being said, the detection method should still be aligned with the values of LFCC, in that it is kept as a simple implementation and does not require large amounts of software overhead; simplicity should not diminish the robustness of the frequency detection method however. It must also be noted that the amplitude of the corresponding frequency command does not carry any information. The amplitude just must be sufficient such that the detect can recognize the frequency signals. Therefore, the amplitude must take in consideration the line drops of the microgrid and thus is why amplitude cannot be used reliably for encoding any information for this scheme.

In order to provide a simple, low-level communication method between energy prosumers on a DC microgrid, the communication method LFCC can be utilized with already existing hardware and even existing droop style communication or control. The current disclosure provides the requirements to implement and presents four methods (binary, sequential, layered and center-layered) based on the type of command, depth of parameters, desire of simultaneous commands, and required throughput.

The current disclosure provides a simple low-level unidirectional global communication method for DC microgrids, and requires no hardware modifications to the microgrid and interfacing power electronic converters. The underlying premise to this communication method is injecting low-frequency low-voltage sinusoidal components into the DC microgrid power lines. This method deviates from the common bit-level communication scheme by relating parameters and commands with certain frequency components. Communication structures are included as a basis for communication protocols, and a detection method is proposed for detecting the injected frequencies. The injection method, communication structure, and detection method are implemented on a live-scale DC microgrid.

As optimization schemes for DC microgrids improve, the ability to adjust certain parameters of connected devices (CDs) becomes critical. This is especially true if any CDs have storage ability and/or renewables, as each CD would have the ability to consume and/or produce energy. Therefore, in order to change these parameters, a simple unidirectional communication method was created: Low Frequency Components Communication (LFCC).

The novelty of this communication style allows for a simple implementation, in the sense that it requires no physical changes to the CDs or the microgrid structure. Following very few constraints and assumptions, the only change needed is to add lightweight injection (encoding) and detection (decoding) software, which consists of the appropriate method for decoding.

LFCC involves injecting one or several small amplitude sinusoidal tones on the DC power lines. The superimposed sine waves encode information in their spectra, while the amplitude is chosen to ensure that all CDs can properly detect the injected tone. The frequency range is chosen such that any connected converter can easily reject the components as disturbances on the power lines; this communication style is expected to work in the extremely and super low frequency bands and below. The advantage of using low-frequency sinusoidal injection is simplicity in transmitting and receiving, the fact that it can work alongside other communication techniques, that it has virtually no electromagnetic compatibility issues, an extremely low harmonic injection related to the superimposed signal, the ability to work at long distances, and the support of application specific protocols. LFCC is envisioned mainly as unidirectional and to provide global commands across the entire microgrid, however, bidirectional communication and addressability are evaluated in this paper.

This method is certainly not the first to utilize the power lines as a form of infrastructure for communication, as commonly implemented technologies currently include: power line communication (PLC), the utilization of droop style control as a form of communication such as with DC Bus Signaling (DBS), and Power Line Signaling (PLS) used as a way of triggering an operating mode. PLC is a verified technique amongst AC grids; however, this requires additional hardware to achieve, due to its higher data rates (300 Hz to 250 MHz), see Chao, C. W.; Ho, Q. D.; Le-Ngoc, T. *Challenges of Power Line Communications for Advanced Distribution Automation in Smart Grid, Proceedings of the* 2013 *IEEE Power & Energy Society General Meeting*, Vancouver, BC, Canada, 21-25 Jul. 2013. The utilization of this frequency band also introduces challenges related to electromagnetic compliance and high probability of signal corruption, due to noisy environments. Droop is typically used as a control by varying the output voltage in response to the load current but this method of altering the DC voltage can certainly be used as a communication method, see Liu, H.; Yang, Y.; Loh, P. C.; Blaabjerg, F.; Angjelichinoski, M.; Stefanovic, C.; Popovski, P. *Power Talk: A Novel Power Line Communication in DC MicroGrid, Proceedings of the* 2016 *IEEE 8th Int. Power Electron, Motion Control Conf. IPEMC-ECCE Asia* 2016, Hefei, China, 22-26 May 2016, and extended to another parameter. Typically, though, droop is considered only with respect to load conditions, and is not extended to multiple various user-chosen low-level parameters.

Within the concept of utilizing existing hardware to perform communication, there has been some work towards utilizing the switching frequency, since it already exists from the power conversion process. In Chou, supra, the switching frequency is varied in response to load or power conditions, which is not too different from droop, and therefore will have the same limitation, as mentioned in previously. In order to allow a bit-based communication, the switching frequency can utilize frequency-shift keying (FSK) and phase-shift keying (PSK), see Wu, J.; Du, J.; Lin, Z.; Hu, Y.; Zhao, C.; He, X. *Power Conversion and Signal Transmission Integration Method Based on Dual Modulation of DC-DC Converters, IEEE Trans. Ind. Electron.* 2015, 62, 1291-1300 and Kohama, T.; Hasebe, S.; Tsuji, S. *Simple Bidirectional Power Line Communication with Switching Converters in DC Power Distribution Network, Proceedings of the* 2019 *IEEE International Conference on Industrial Technology (ICIT)*, Melbourne, Australia, 13-15 Feb. 2019; pp. 539-543. These methods require taking a carrier, in this case the switching frequency, and discretely switching between two different frequencies or phases (in the simplest case), which will represent the data '0' and '1'. This method is dependent on converter topology, conduction mode (continuous or discontinuous), and whether the topology is responsible for power delivery or consumption, see Wu supra. The detection methods may not work if a load disconnects from the grid, which could be the case for self-sustaining loads (i.e., with storage elements). Furthermore, altering the switching frequency may not be a suitable method for all converters, due to potential operational issues and any parametric algorithms dependent on the control frequency. Both Chou and Wu utilize Fourier transform based methods, in order to detect the appropriate frequencies, which can be both computationally and memory intensive. However, it must be said that specialized Fourier techniques (such as zoom or sliding), paired with an appropriately coded digital signal processor can be quite efficient. Lastly, in Monti, A.; De Din, E.; Muller, D.; Ponci, F.; Hagenmeyer, V. *Towards a Real Digital Power System: An Energy Packet Approach, Proceedings of the* 2017 *IEEE Conference on Energy Internet and Energy System Integration (EI2)*, Beijing, China, 26-28 Nov. 2017; pp. 1-6, frequencies from 16-26 Hz are injected onto the grid from a voltage source converter in the form of "energy packets" (in regard to energy being a major control parameter), and each frequency represents a 0 bit or 1 bit for a specific converter. This is probably the most similar to LFCC, however, the utilization of the injected frequencies is quite limited, and the use of binary representation could mean a considerable amount of time would have to pass before the communication is decoded.

LFCC aims to allows an alternative communication method on DC power lines without the complications of more advanced methods such as PLC. A succinct advantage of this method is that it can also be implemented alongside the previously mentioned methods for communication, since the method in which communication occurs is decoupled or independent from the methods the others use.

The detection of the injected frequencies is performed by a second order generalized integrator (SOGI) phase locked loop (PLL) (SOGI-PLL), in conjunction with infinite impulse response (IIR) bandpass filters. A multiplexed detection scheme is also discussed to ensure a low computational burden on the interfacing converters' controllers. The following sections will provide a common and basic structure for designing the application specific protocol for LFCC.

Communication Approach

This section describes the general specifications and metrics for LFCC, how a command will be represented by its parameters, and how to map the frequency space to the command(s). Then, the communication method for sending commands, entitled Layered-Parameter Command (LPC), is presented as a basic structure which can be modified or utilized to create a new communication method. This method, along with all terminology and concepts, was created specifically for the type of communication that is LFCC, and as stated before, this allows LFCC to have an application specific protocol, which is necessary due the high dependence of system variables. Lastly, some more advanced features of LFCC will be discussed relating to channel separation and feedback.

Since the commands are sent via frequency injection on the DC power lines, the DC microgrid voltage, at all times, can be represented by:

$$V_{GRID}(t)=V_{DC}+V_{CMD}(t) \quad (1)$$

where $V_{DC}$ is the nominal DC voltage of the grid and $V_{CMD}(t)$ represents all the injected frequencies that could exist for a given protocol. If the number of those injected frequencies are given by n, then $V_{CMD}(t)$ expands to:

$$V_{GRID}(t)=V_{DC}+V_{CMD}(t) \quad (11)$$

The frequency values $f_i$ and corresponding amplitudes A are described in the following sections and the voltage $V_{pi}$ refers to the parameter that makes up the command.

Before detailing the generalized specifications, a few assumptions are assumed about the DC microgrid system. These assumptions mainly depend on the controller for the interfacing converters (the converter connected to the DC power lines):

1. The control is performed digitally with a microcontroller or digital signal processor (DSP);

2. The control algorithms can be updated in deployment, and there exists read-only memory (ROM) space and computational and memory overhead;
3. There exists a voltage transducer/sensor at the DC grid power lines.

Assumption 2 is only intended for already deployed applications, and Assumption 3 is reasonable, due to typical signals needed for either control feedback or fault purposes. These assumptions are made, so that this communication method requires no additional hardware.

Specifications and Metrics

The specifications of LFCC are explained here, in order for the user to properly design LFCC for their system. Each system will be different, and therefore the capabilities of LFCC will depend on the DC microgrid configuration, as well as the interfacing converters. Therefore, the specifications and metrics are usually defined in the fuzzy sense (e.g., small, large, low, high, etc.), as they are highly system dependent.

The first set of specifications deal with the signal attributes of the injected frequency: the frequency range or bandwidth of LFCC and the injection amplitude. The smallest frequency will mainly depend on the detection algorithm, but it is reasonable to assume to be within the range of 0.5-10 Hz. The highest frequency will largely be determined by the input bandwidth of the converter.

The interfacing converters need to reject these sinusoidal disturbances, in order to not compromise converter regulation. It is also assumed the sampling rate of the control algorithm is significantly faster than the largest frequency of LFCC, therefore the detection algorithm offers no substantial constraint.

With respect to amplitude, information is only encoded in the spectra, however, the amplitude must be chosen in order satisfy the signal-to-noise (SNR) requirements in terms of detectability for all CDs.

This should be in consideration to possible distortion from noise (coupled or conducted from other devices), sensor/transducer non-linearities and sensitivity, and digital specifications, mainly being the analog to digital converter (ADC) effective number of bits (ENOB).

The second set of specifications deal with how LFCC is used: the criticality of the parameters to be changed and latency. The criticality is defined by the largest consequence from either loss of communication or erroneous detection. This means that should one of those two events occur, it is desirable for the quality, stability, and safety of the grid to not be compromised. Because this communication scheme is unencrypted and does not typically have feedback (or message verification), although this is discussed infra, the commands used in LFCC should be of low criticality, and thus better suited for optimization purposes. Since the criticality is made low, this means the requirements for latency are also made low, as the dynamics of low criticality optimization parameters are most likely expected to occur over minutes to hours. Latency is defined by the maximum length of time required for a CD to decode a command sent via LFCC, which is used to calculate throughput (as commands per second (cps)). Because this is not a bit-level scheme, and more an instruction or command scheme, latency is mainly determined by how quickly the detection method detects all injected frequencies, plus an additional buffer time or headroom. Latency can typically be expected to exist between 50-500 ms, or 2-20 cps, which would be the time interval the next command can be sent. This number is derived from the time it takes for the chosen decode method. Since this is dependent on processor speed and algorithm choice, an estimation is derived from experimental results and from Wu, Kohama, and Monti. Slower latencies may also aid in reducing computational burden, by allowing the CDs to periodically sample the grid instead of a constant monitoring scheme.

In order to evaluate the communication method, two criteria have been developed to outline the method's performance in terms of: parameterization depth and frequency space utilization.

Parameterization depth provides an insight to the quantity of parameters a single command can reasonably take, as well as the number of sub-parameters a parameter can contain, and frequency space utilization provides an insight to how much of the frequency space a method will consume.

Additionally, latency is also included as a metric, which has already been defined.

Command Mapping and Definitions

Here, several terms common to LFCC are further explained for better understanding. Also described is the parameterization of commands. The secondary purpose of this section is to assist in the decoding of injected frequencies.

The frequency or spectrum allocation towards LFCC will be made up of 'spaces' and 'bands'. The entire spectrum is referred to as the frequency space: the frequencies from the smallest to the largest frequency that LFCC uses. If referencing a particular portion of the frequency space, that is referred to as a frequency band. There will also be frequency bands in which it is desirable to have no injection or detection take place, aptly named the null-frequency band. This exists as a construct to remove frequency bands from the frequency space that would cause issues, such as known system frequencies, which could cause false detection, or as a way of providing a buffer or isolation between two frequency bands.

A command is comprised of one or several parameters and only serves as a structural "parent" to organize the associated parameters. This helps to partition the available spectrum in LFCC. As seen in FIG. 1, the command/parameter hierarchy has a type of tree structure in the sense that there is a downward traversal, where each parameter belongs to its own frequency band defined by the min and max frequency of that band. It may also be noticed that the parameters in each branch can be of two types: a selection parameter or a value parameter. The selection parameter presents itself as a way of selecting options or sub-parameters, which may also allow a further traversal to another parameter.

In the case where an option has an associated value that needs to be chosen, the value parameter is used. The value need not be numeric, but is rather based on what the option of the selection parameter requires for its specific application.

For the selection parameter, the frequency band is evenly partitioned, based on the possible number of options. These partitions collectively make the parameter space, and may be referred to as sub-parameters. All parameter spaces that make up a command will be collectively known as the command space. A single parameter command's command space will be the same as the parameter space. The value parameter may also be partitioned, or numeric values may be linearly mapped within the frequency band. The value parameter is typically the final parameter of a branch. The purpose of these two parameters is to discern the decoding process, and reveal the intention of the command more clearly.

Figure 10:
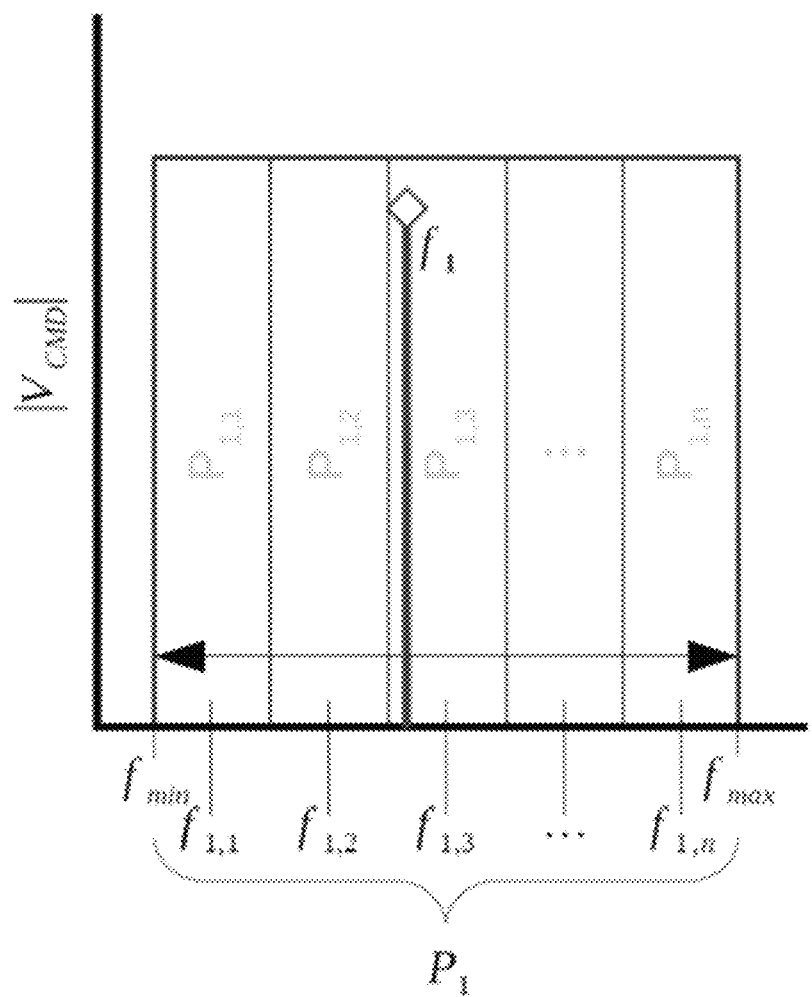
FIG. 10 shows how a frequency band is evenly partitioned and defined by each sub-parameter's center frequency.

For frequency bands that are evenly partitioned, each partition is described by its center frequency, whose width is dependent on the parameter space width and number of partitions, which is described by Equation (12) and seen in FIG. 10.

$$\begin{cases} C_{sp1}, P_{sp1}, f_1 \in [f_{min}, f_{max}], P_1 \in [1, n_{p_1}] \\ P_{1,n} \in [f_{min} + \rho(n-1), f_{min} + \rho n] \\ P_{1,n} := f_{1,n} = f_{min} + \frac{\rho}{2}(2n-1) \\ \text{s.t. } n = 1, 2, \ldots n_{p1}, \rho = \frac{f_{max} - f_{min}}{n_{p_1}} \end{cases} \quad (12)$$

where $P_{1,n}$ indicates each partition and thus is $P_1$'s sub-parameters contained in the parameter space $P_{sp1}$, which, in this case, is also the command space $C_{sp1}$, since there exists only one parameter for this command. Variable $f_1$ is the injected frequency, $f_{1,n}$ is each partition's center frequency (which defines $P_{1,n}$), $f_{min}$ and $f_{max}$ are the minimum and maximum frequencies parameter $P_1$ exists in, and $n_{p1}$ is the number of partitions within $P_1$. The width of each partition should be determined with consideration to the accuracy of the detection algorithm, sensor ability, and max deviation of signal (i.e., signal with noise). Therefore, the width of each partition will be dependent on the frequency range of $P_{sp1}$ and the amount of required partitions. The value of $P_1$ is chosen by examining the partition that frequency $f_1$ falls in. This partition can be represented by its corresponding center frequency $f_{1,n}$, where the second line in Equation (12) defines that frequency's allowed deviation, while still being able to be correctly detected. Therefore, the partition can be found by comparing the nearness of $f_1$ to each $f_{1,n}$, so whichever element satisfies $\min\{|f_1 - f_{1,n}|\}$, is the appropriate partition and thus parameter for $P_1$. Conversely, simply utilizing if-else statements to check which frequency partition the detected frequency falls within, utilizing the second line of Equation (12), is acceptable as well.

When the frequency value is linearly mapped to a frequency band, then it could prove useful to have that represent a certain setpoint or rate, the two variations typical of a value parameter. The setpoint mapping compares the injected frequency with the frequency width of the frequency band, and computes a percentage that can be mapped to a real system variable. The rate mapping compares the injected frequency, not only in terms of the frequency band, but also with respect to the band's center frequency. Instead of producing a reference or setpoint, this method would set a positive or negative rate of change for the respective variable. For the rate case, the maximum frequency of that band would be defined as the maximum rate of change for the assigned variable.

For the setpoint mapped parameter, consider $P_1$ from Equation (12). To produce a value from 0% to 100%, the encoding (mapping a parameter to a frequency) and decoding (mapping a frequency back to a parameter) are defined by Equation (13) and Equation (14) respectively, where $P_1$ is a unit-less value.

$$f_1 := \left[\left(\frac{P_1}{100\%}\right)(f_{max} - f_{min})\right] + f_{min}, \text{ s.t. } P_1 \in [0, 100] \quad (13)$$

$$P_{setpoint} = P_1 := \frac{f_1 - f_{min}}{f_{max} - f_{min}} \times 100\% \quad (14)$$

In the case of the rate mapped parameter, the intention is to produce a value from −100% to 100%; the encoding Equation (15) and decoding Equation (16) are a modification of Equation (13) and Equation (14):

$$f_1 := \left[\left(\frac{(P_1 + 100)}{2 \times 100\%}\right)(f_{max} - f_{min})\right] + f_{min}, \text{ s.t. } P_1 \in [-100, 100] \quad (15)$$

$$P_{rate} = P_1 := 2P_{setpoint} - 1 \quad (16)$$

It is not uncommon that the value parameter is itself the selection parameter. For example, if one parameter of the system needs constant adjustment, it makes sense to dedicate a frequency band to that parameter. The rate and setpoint parameters would be commonly used, although not exclusively, in the constant adjustment case.

Communication Method

A detailed evaluation of the communication method is presented here. In most cases, the frequency space will consist of multiple commands, but the method is presented here consisting of a single command with multiple parameters. Therefore, the command space will be the frequency space.

Figure 11:
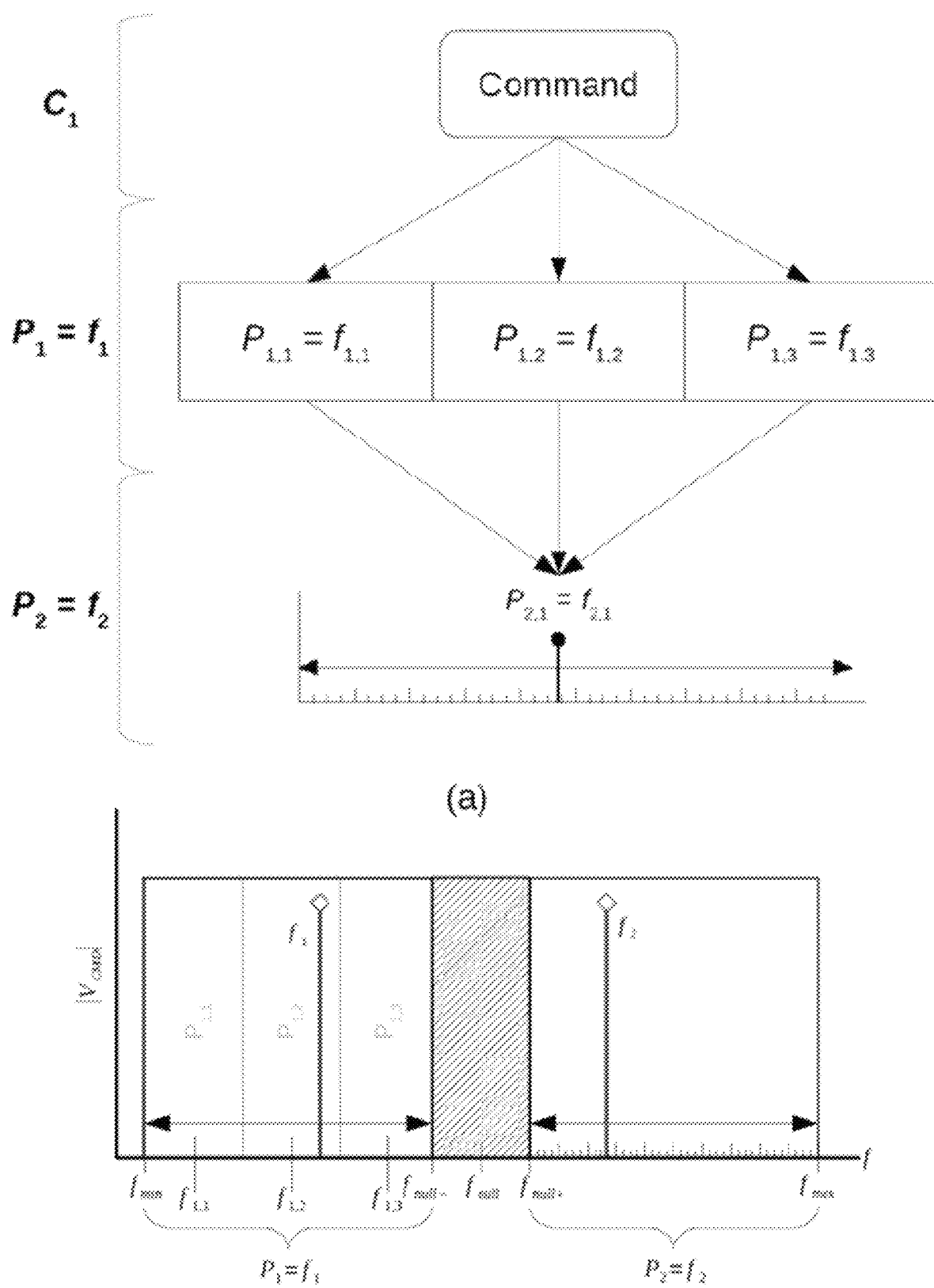
FIG. 11 shows an example two-parameter command. Command tree (a) and frequency allocation graph (b) for each parameter.

Consider for a two-parameter command, each parameter has its own frequency band, thus the command space is comprised of two frequency bands with a null-frequency band in between described by Equation (17), and shown in FIG. 11.

$$\begin{cases} C_{sp1} \in [f_{min}, f_{max}], f_1 \in [f_{min}, f_{null-}], P_1 \in [1, 3], \\ f_2 \in [f_{null+}, f_{max}], P_2 \in [0, 100], f_{null} \in [f_{null-}, f_{null+}], \\ f_{null-} = f_{null} - \epsilon, f_{null+} = f_{null} = \epsilon, \\ \epsilon = \frac{f_{null+} - f_{null-}}{2} \end{cases} \quad (17)$$

where, with respect to the null-frequency band, $f_{null-}$ and $f_{null+}$ describe the upper and lower frequency limits $f_{null}$ is the center frequency, and is the half interval width. Consider the first parameter $P_1$ to be a selection parameter comprised of three sub-parameters ($n_{p1}=3$) as defined in Equation (12), but with the intervals defined in Equation (17), and the second parameter, $P_2$, to be a setpoint value parameter.

Considering the two-parameter case defined above, LPC will describe the method of communicating the parameters of the command over the DC microgrid. The injected frequency for each parameter of the command space are produced at the same time for some time equal to the latency, where each parameter belongs to its own frequency band (FIG. 11 at b). This can mathematically be seen in Equation (18).

$$V_{CMD}(t) = (A_1 \sin(2\pi f_1 t) + A_2 \sin(2\pi f_2 t) \quad (18)$$

where $V_{CMD}(t)$ is the command voltage superimposed over the DC bus, as was seen in Equation (1).

In this format, commands are difficult to misinterpret, and since all parameters are available for decoding, the main contributor of latency for this method is the decoding process. These advantages come at the expense of a non-optimized utilization of the frequency space, since each command's parameters have their own respective frequency band. The parameterization depth can be reasonably high along with the quantity of sub-parameters a selection parameter can contain, however this is somewhat dependent on the frequency space consumed, which can be the bottleneck.

Channel Separation, Addressability, Feedback, and Feasibility

This section examines additional properties of LFCC that could be implemented: channel separation, address ability, feedback, and feasibility. Channel separation takes advantage of system variables to expand the number of commands, and possibly differentiate between them, addressability assesses how and if each CD can be individually controlled with LFCC, feedback allows a form of response between all CDs, and feasibility examines signal to noise ratio (SNR) and channel attenuation. Each property may be utilized independently or together.

Channel separation will utilize different parts of the DC microgrid system, in order to expand the frequency space. The maximum frequency of the frequency space will typically stay the same, however, the same frequency space can be utilized elsewhere allowing a possible doubling or tripling of commands and or parameters. This may allow certain devices to communicate exclusively or enable a bidirectional communication structure thus better enabling feedback. This can be done in at least two ways: current injection and utilization of multi-level voltage structures. The current injection would prove to be more difficult than the voltage injection and is mentioned here as a possible method. The more likely form of channel separation will appear in the multi-level voltage structure commonly implemented in DC microgrids as a bipolar voltage structure.

Therefore, as long as each voltage rail can be independently controlled, one frequency space can be implemented on the positive voltage rail, while the other can be performed on the negative voltage rail.

Addressing may be desirable if more customized commands are needed to be sent. Additionally, it may allow CDs to send back state and fault information. If the quantity of CDs can be reasonably made as the sub-parameters of a parameter, then individual addressing of each CD can be performed, by assigning that as the primary parameter of a command. Likewise, if bidirectional communication occurs, this method also allows the CD to identify itself. However, for larger scale microgrids, this is not feasible. But even if individual addressing cannot be performed, regional addressing can, being performed the same way as individual addressing. Typically, the microgrid will serve a community, which can be organized via streets, cul-de-sacs, or quadrants, and addressing it this way can still allow a more customized control, and can take advantage of characteristics of that grouping.

Feedback is explained third, due to its usual need for individual addressing, and therefore it will have to utilize the addressability and channel separation paragraphs. Feedback, in this sense, aims at certifying if the message from the transmitter has been received and, more so, correctly. While this can be implemented, especially taking advantage of channel separation, it is not feasible on a large scale (>10-20 CDs), therefore, feedback should be performed implicitly. The parameters LFCC adjusts will ultimately affect the operating state of the microgrid, and, assuming the number and type of CDs are known, a predicted response can be estimated with respect to the current command. Therefore, if the microgrid behaves abnormally to the command, then either there may exist erroneous or missed communication, incorrect encoding or decoding settings, or a possible nefarious actor.

The assessment of SNR and channel attenuation are quantitatively outside the scope of this paper; however, they will be addressed in order to understand the general implications towards this communication method. SNR is mainly determined from the transmitter, receiver, and transmission medium. For this method, the transmitter and receiver present the most significant effect towards SNR, whereas the DC microgrid transmissions lines can be neglected for this analysis. Furthermore, the frequencies used with LFCC are so far removed from typical conduction sources that interference is also highly unlikely (but should it be, the null-frequency band exists for this reason). Transmitting will mainly depend on the sensitivity of voltage feedback transducers, ADC resolution and quantization, and power electronic switch drive resolution. Similarly, for the receiver, it will also depend on voltage transducers and their corresponding ADC performance, alongside the discrimination ability of the chosen decoding algorithm. Another strength of injecting at such low frequencies is the minimal channel attenuation, or attenuation through the DC microgrid power lines, that occurs. At frequencies utilized by LFCC, the resistive losses in the cable will be the dominant impedance, as inductive impedance is several orders of magnitude smaller, and capacitive impedance remains significantly large. Furthermore, skin effect has a negligible effect (on the order of hundreds of microvolts) towards the resistance of the power lines. Due to this, it is not unexpected to only see 0.05 dB of loss per every kilometer, which accounts for less than a 0.5% signal loss per kilometer.

Detection Method

This section outlines how to detect the injected frequencies based on the methods presented in the previous section. It must be noted that the injection method is not covered in great detail due to its simplicity: once the parameter to frequency encoding process is complete (either from Equation (12), Equation (13), or Equation (15)), the DC microgrid regulating converter's controller reference will include a sine wave generator to be added to the DC reference. Since the commands are comprised of sine waves, the detection can be limited to single-tone detection methods, as only one tone will be present per frequency band. Of course, there will be multiple tones present for LPC or just multiple commands in general. Regardless, the method for detection can still be of the single-tone method.

This section is not a survey on all possible methods, but rather exemplifies one possible technique, which can be replaced by another if desired. Possible alternative detections methods may include zero-crossing detection, band-pass filtering with envelope detection, or spectral techniques such as the zoom or sliding DFT. This paper utilizes an infinite impulse response (IIR) bandpass filter, see Aboagye, A. K. *Overflow Avoidance Techniques in Cascaded IIR Filter Implementations on the TMS320 DSP's; Technical Report; Texas Instruments*: Dallas, TX, USA, May 1999; pp. 1-17. Available online: http://www.ti.com/lit/an/spra509/spra509.pdf?ts=1588655003153 (accessed on 12 Jan. 2019), followed by a phase-locked loop (PLL) that uses a second order generalized integrator (SOGI) as the phase detector, see Mozdzynski, K.; Rafal, K.; Bobrowska-Rafal, M., *Application of the Second Order Generalized Integrator in Digital Control Systems. Arch. Electr. Eng.* 2014, 63, 423-437; Ciobotaru, M.; Teodorescu, R.; Blaabjerg, F., *A New Single-Phase PLL Structure Based on Second Order Generalized Integrator, Proceedings of the* 2006 37th IEEE Power Electronics Specialists Conference, Jeju, Korea, 18-22 Jun. 2006; Xiao, F.; Dong, L.; Li, L.; Liao, X. *A Frequency-Fixed SOGI-Based PLL for Single-Phase Grid-Connected Converters, IEEE Trans. Power Electron.* 2017, 32, 1713-1719, Kulkarni, A.; John, V., *A Novel Design Method for SOGI-PLL for Minimum Settling Time and Low Unit Vector Distortion, Proceedings of the IECON* 2013—39th Annual Conference of the IEEE Industrial Electronics Society, Vienna, Austria, 10-13 Nov. 2013; pp. 274-279; Renesas, *Loop Filter Component Selection for VCXO Based PLL, Application Note Renesas*; Renesas: Tokyo, Japan, 2020; pp. 1-9. Available online: https://www.idt.com/us/en/document/apn/849-loop-filtercomponent-selection-vcxo-based-plls (accessed on 13 Feb. 2019). This is chosen due to its robustness and low computational burden as an additional control loop, where the SOGI phase detection helps alleviate the digital input filter burden due to its natural bandpass filtering around its resonant frequency. PLLs are also used, due to the frequency-tracking requirement from the value parameters. Additionally, since most power system engineers that work with power electronics have worked with AC grids, PLLs would be a method the engineer is most likely familiar with. For multiple frequencies, a multiplexed detection method is discussed to allow evaluation of several frequency bands over time, while not increasing computational load at the expense of additional ROM space. This detection method works for both the layered and packet-based commands.

Filter and PLL Structure

Figure 12:
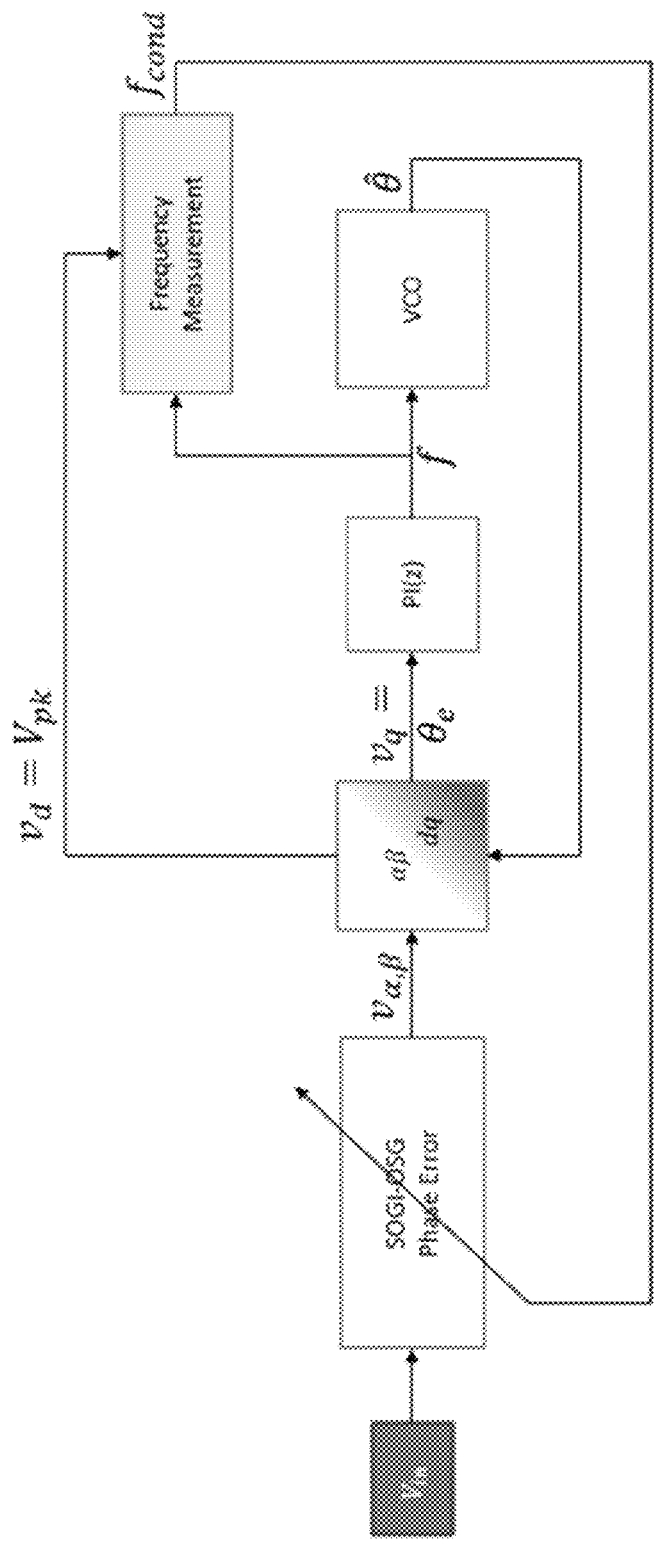
FIG. 12 shows a block diagram of the second order generalized integrator (SOGI) phase locked loop (PLL) (SOGI-PLL).

The algorithm consists of two main parts for frequency detection: the filtering/signal conditioning stage and the actual PLL stage. The filter/signal condition stage removes the DC component, bandpass filters the signal within the frequency space, in order to isolate the signal from other injected frequencies and noise, and finally normalizes the amplitude to 1 $V_{peak}$ with an automatic gain control (AGC), see Lyons, R. *Understanding Digital Signal Processing, 3rd ed.*; Prentice Hall: Upper Saddle River, NJ, USA, 2010, in order to avoid issues with the PLL. The SOGI-PLL block diagram is depicted in FIG. 12. The PLL is constructed from a phase detector, or orthogonal signal generator (OSG), park transformation, loop filter (PI filter), and VCO. The SOGI algorithm is what makes up the phase detector. The output of the VCO provides phase information to the park transformation and the output of the PI filter provides the detected frequency. The frequency measurement block filters the frequency signal in order to provide a more stable measurement and also determines if the signal is stable enough to consider the PLL locked.

The lock state is determined by measuring the rate of change of the frequency signal, and if there is a frequency component of significant amplitude by measuring $v_d$ from the park transform block. This condition frequency ($f_{cond}$) is also fed back to the SOGI block, making it frequency adaptive, in order to tune the SOGI resonant frequency to increase performance.

Multiplexed Detection Scheme

Figure 13:
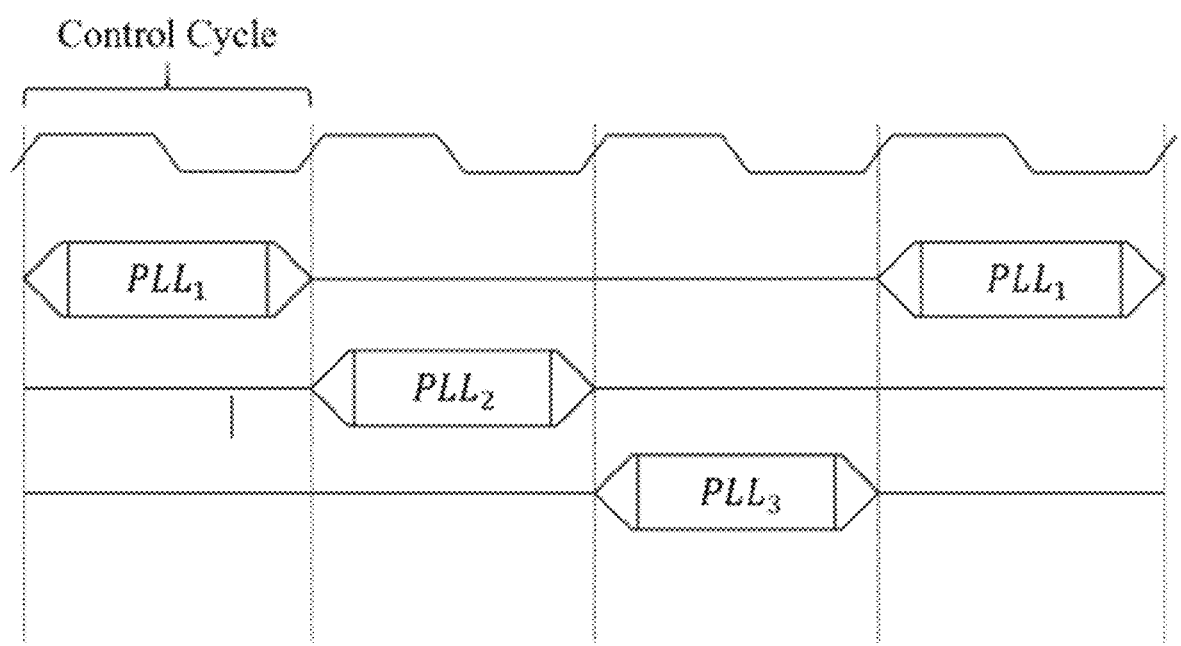
FIG. 13 shows PLLs operated under the multiplexed detection scheme.

The multiplexed detection scheme allows the SOGI-PLLs to be scheduled to run in a staggered manner. An example of this is demonstrated in FIG. 13 for a three PLL case. This essentially down-samples the SOGI-PLL by the total number of PLLs, and allows only one SOGI-PLL to run per control cycle. Considering the control loop period is significantly shorter than the detected frequencies, it is possible to allow for 10-15 SOGI-PLLs in a single program to run properly, before sampling issues arise. Furthermore, it is also possible to reduce the order of the digital filters, since the order typically falls with decreasing sampling frequency. Since the signal conditioning and SOGI-PLL are parametric, this approach can be thought of as gain scheduling, where each frequency band has its own corresponding gains and coefficients.

Experimental Results

This section describes the results found from the experimental implementation. The detection method was first tested and evaluated in a Matlab/Simulink environment, and the experiments were carried out on an Imperix rapid prototyping power electronics platform. The Imperix system consists of control hardware (BoomBox), which utilizes a TI DSP (TMS320C28346) that can be used with Simulink's code generation feature. A scale microgrid is designed using Imperix half-bridge modules (PEB8032) and LEM voltage and current transducers to design appropriate DC-DC converters for DC transmission line interfacing and battery charging/discharging. For the experimental setup, a CES (community energy source) and three houses are designed with the half-bridge modules and transducers. These half-bridge modules comprise the corresponding buck and boost converters for each CD for the positive and negative rail. Each half-bridge is rated for 800 V, 32 A, up to 10 kVA, and is operating at 20 kHz.

The CES can be powered from lab power supplies or a Power Hardware in the Loop (PHIL) interface, and the house loads are also connected to a PHIL interface, which mimic DC loads. The remaining houses of the microgrid can be simulated and represented cumulatively as a single PHIL interface.

Figure 14:
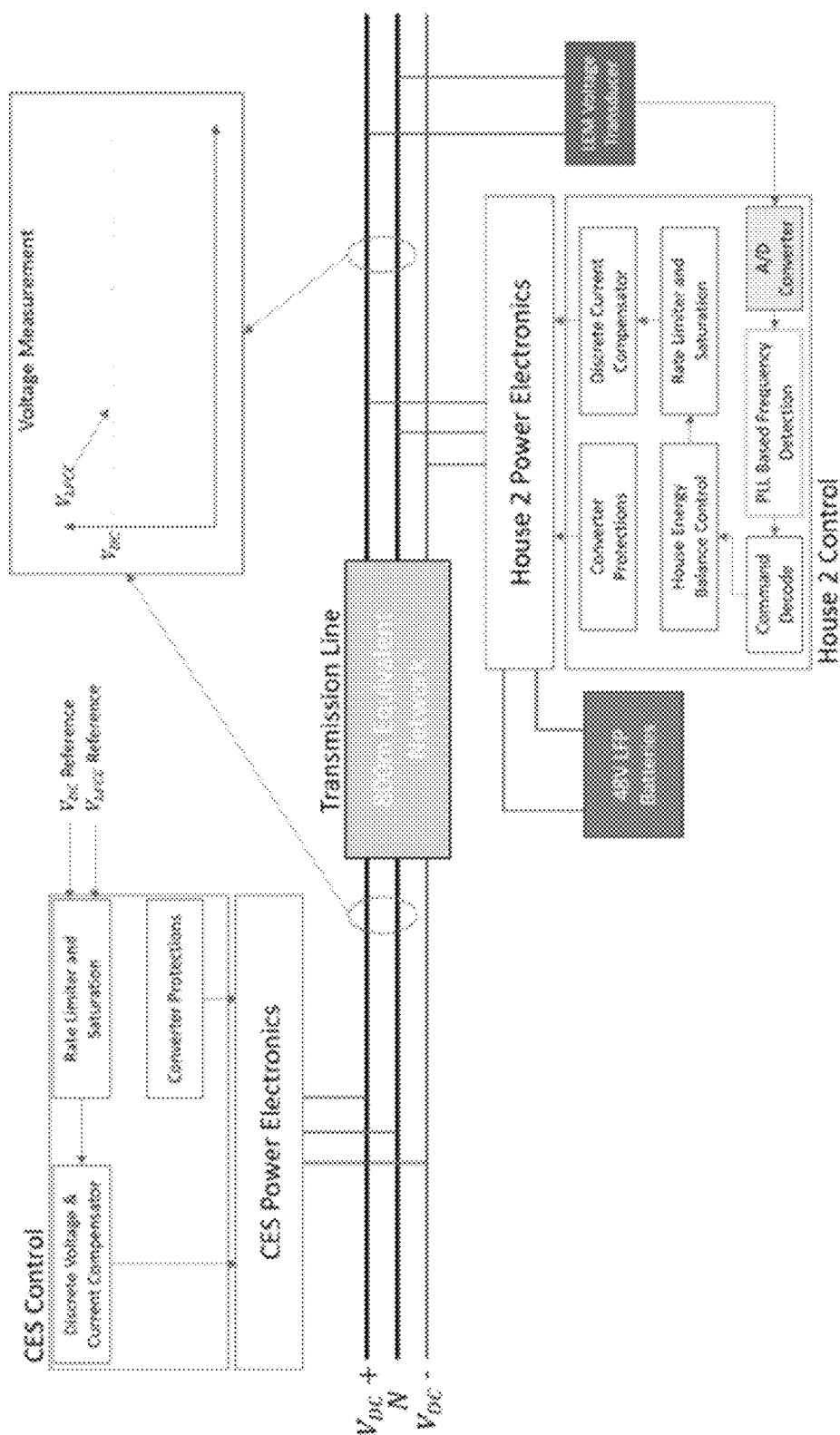
FIG. 14 shows a live-scale DC microgrid experimental setup diagram.
Figure 15:
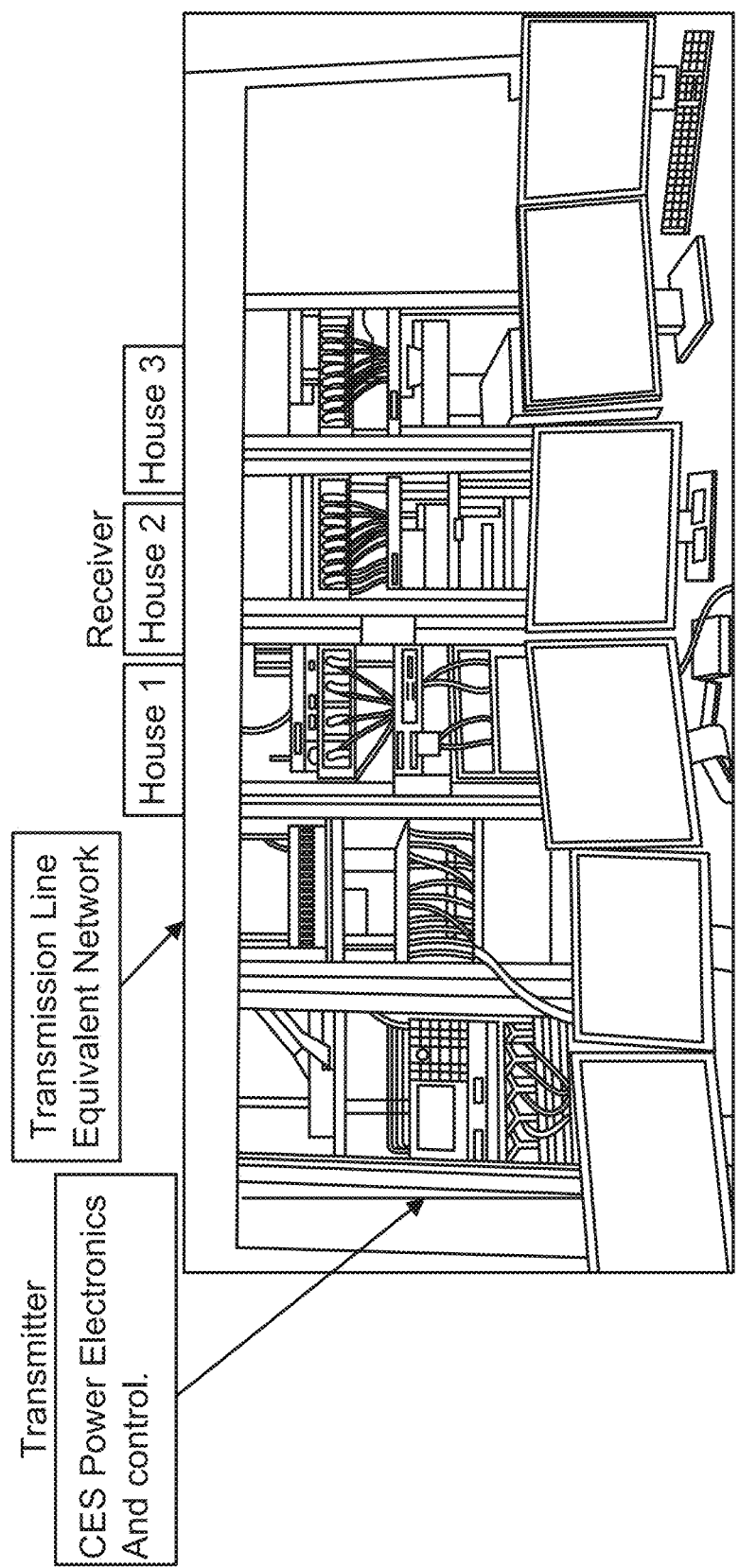
FIG. 15 shows a live-scale DC microgrid physical setup.

To emulate distance from the CES to the house, an equivalent impedance PHIL interface. To emulate distance from the CES to the house, an equivalent impedance circuit that represents 400 m is placed between each connection. This circuit is designed to have inductance, capacitances, and resistance values of 66 uH, 4.7 nF line-to-line, 22 nF line-to-neutral, and 22 mΩ per 100 m. Since this experiment is being conducted on House 2, there will be a total of 800 m equivalent impedance from the CES. This aspect and all salient details of the experiment can be seen in FIG. 14. The physical setup can be seen in FIG. 15.

Figure 16:
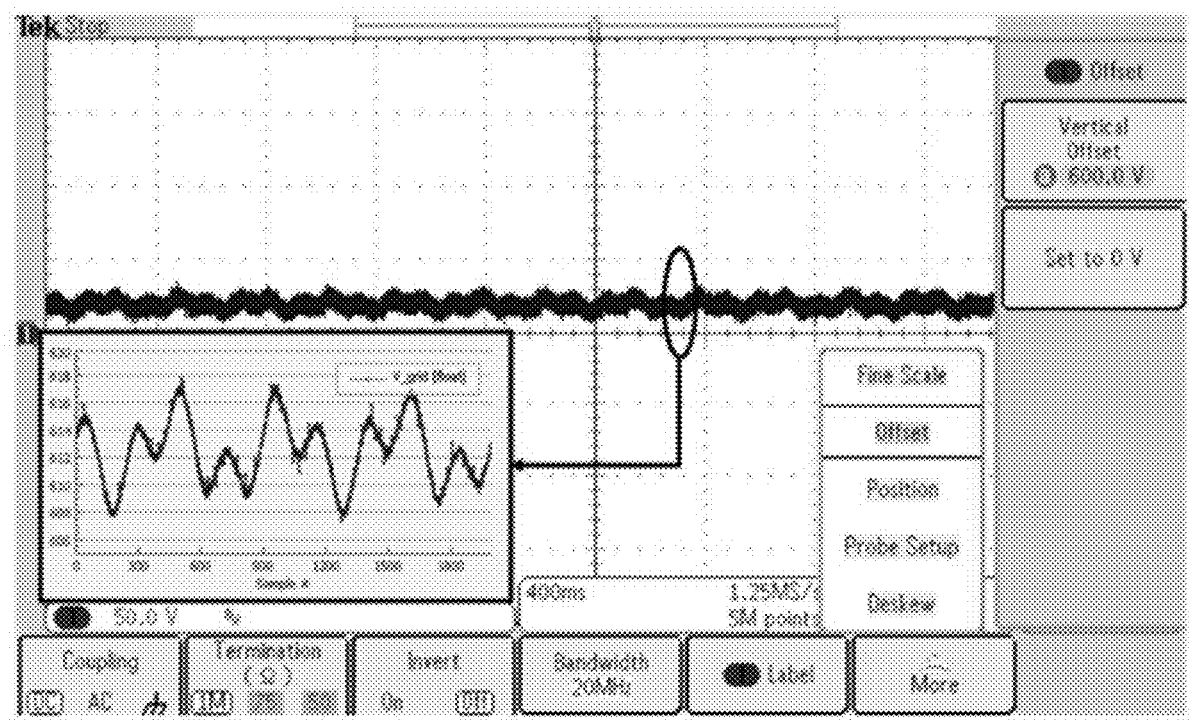
FIG. 16 shows an oscilloscope screen capture of 600 V positive DC microgrid voltage rail.

The experiment will demonstrate assigning numeric values to three variables using the layered parameter communication method, while 1 A is being drawn from the DC grid (CES), and all connected converters are actively switching. The CES will inject two simultaneous frequencies at 2 $V_{peak}$ on the positive ~600 VDC rail, see FIG. 16, while House 2 will detect the frequencies with two simultaneously running SOGI-PLLs. This experiment will utilize the command tree example shown in FIG. 11, where the command and parameter spaces are numerically defined in Equation (19).

Figure 17:
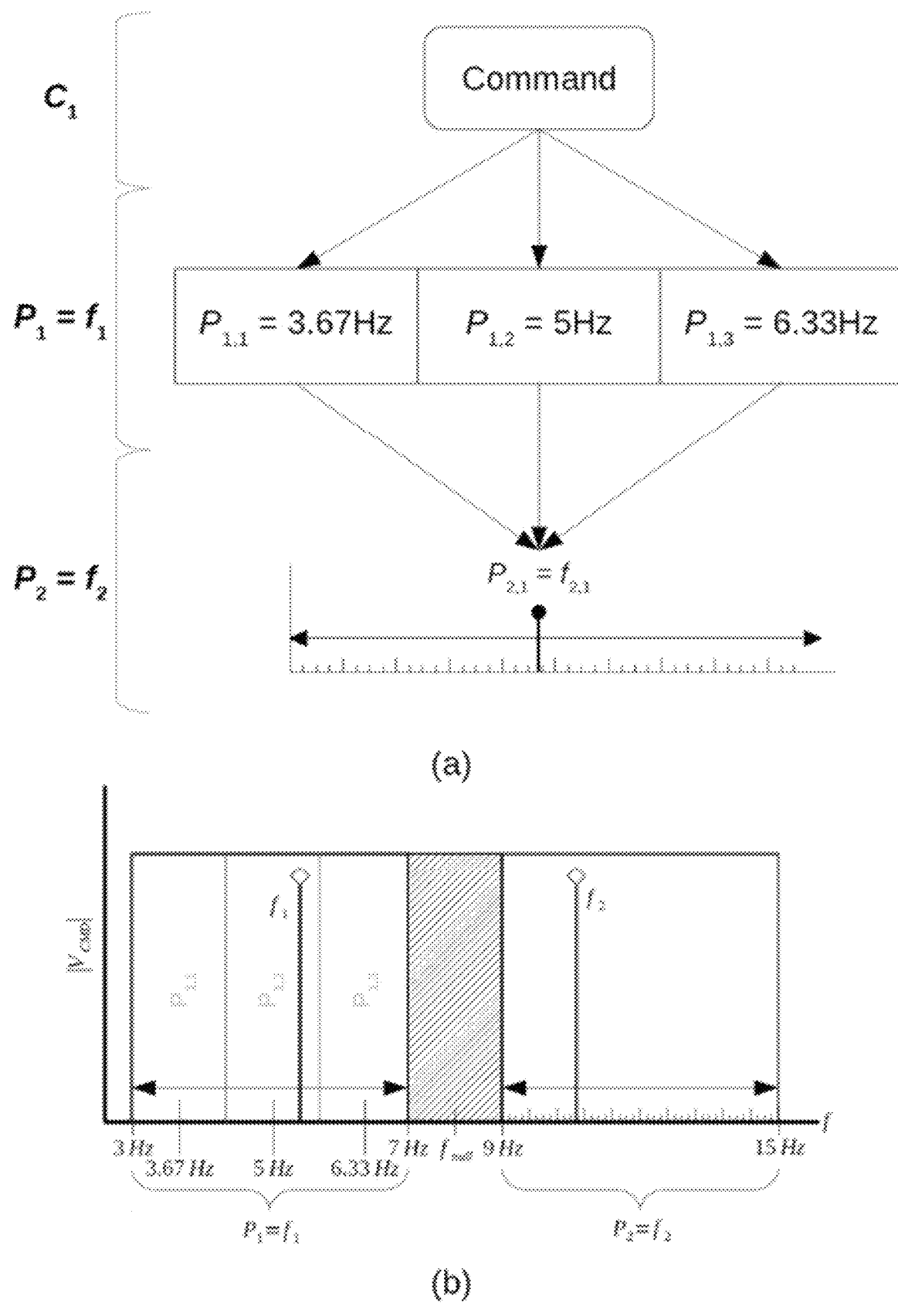
FIG. 17 shows a two-parameter command with numerically defined values defined by the command tree (a) and frequency allocation graph (b) for each parameter.

The command tree with numerical definitions can be seen in FIG. 17.

$$C_1 \in [3,15], P_1 \in [3,7], P_2 \in [9,15] \tag{19}$$

The three variables are the three sub-parameters of $P_1$, where the parameter $P_2$ is a setpoint mapped parameter, which will be used to define each variable. This demonstration exhibits $P_{1,1}$ being set to 25%, $P_{1,2}$ to 50%, and $P_{1,3}$ to 75% in that order, and then back to 0% in reverse order, which can be seen in FIG. 18. Examining the lower graph of FIG. 18, $PLL_1$ is detecting the frequency value that represent the numeric value ($P_2$) to be written to the sub-parameter ($P_1$), detected by $PLL_2$. When the detection of a new parameter occurs, the last state of the previous parameter will be held, since only one PLL is being used to detect the corresponding values for each parameter.

Figure 18:
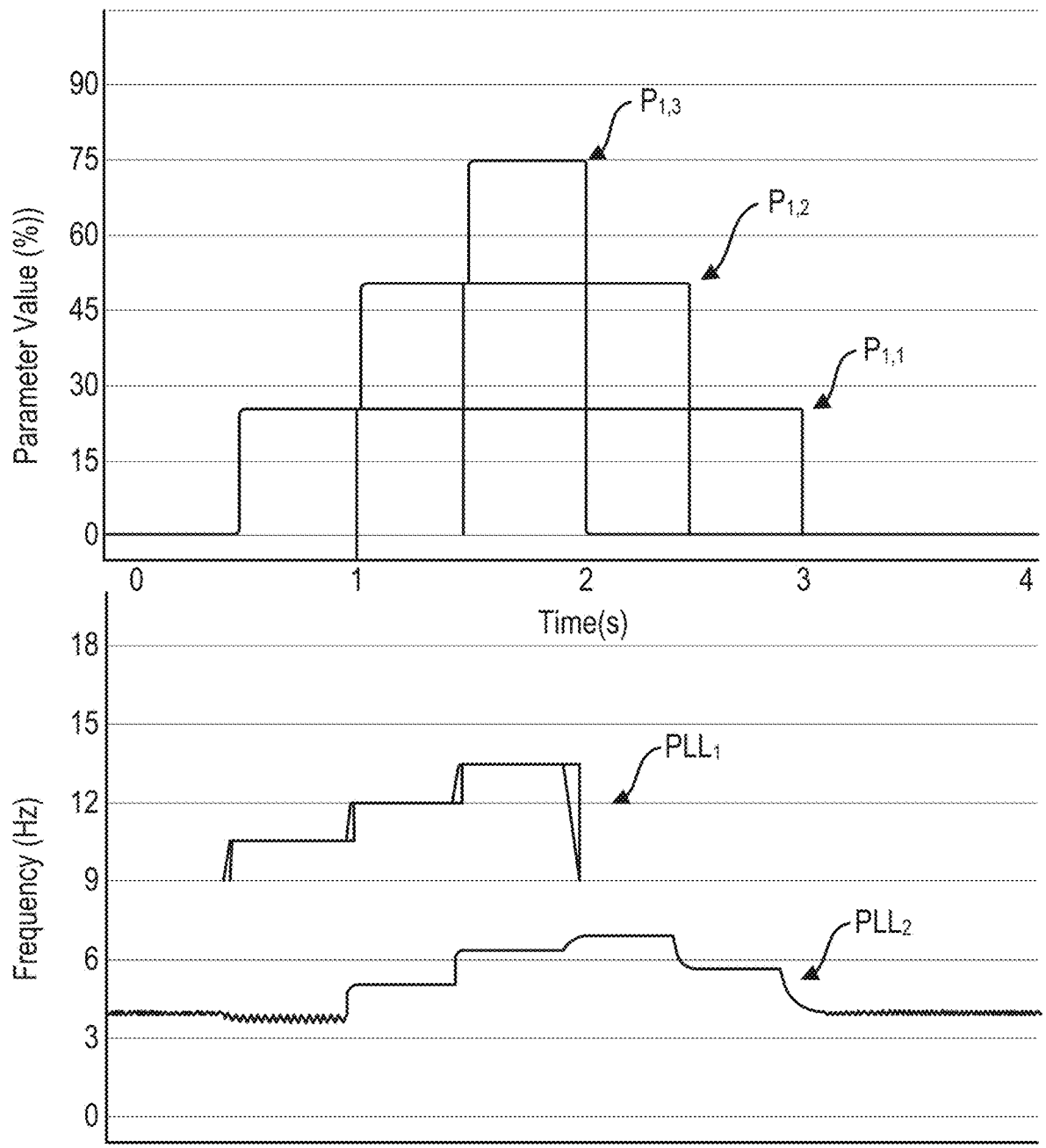
FIG. 18 shows results of the experiment: assigning values to three sub-parameters (upper) and frequency detection by each PLL (lower).

The decoding process can be viewed in the upper graph of FIG. 18. Notice that $PLL_2$ seems to detect different values for the same parameter (the second half has higher frequency detection than the first half). This is not because the CES is injecting a different frequency, but because the parameter space that determines $P_2$ (detected by $PLL_1$) is so close to the other parameter space that it affects the accuracy of the other PLL. This is left in to demonstrate that due to the partitioning of $P_1$, the detection for each sub-parameter (or partition) can be robust to some amount of error. This is also left in to advise on the correction of this issue: either the bandpass filter will have to be made more aggressive, either at the stop frequency location or attenuation level, or the null frequency band will need to be made wider. Changing the filters will most likely add some computational cost while increasing the null frequency band width will consume more of the frequency space and may require re-tuning of the PLL for a different frequency band. It may also be noticed that each parameter ($P_{1,1}:P_{1,3}$) sometimes contains some noise, which is due to the direct use of the frequency variable from the PLL control.

Therefore, noise and control artifacts will be present if a value parameter is required to have a high amount of resolution; for this experiment, since the frequency variable is being directly used, this represents the worst-case scenario for this setup. Either additional filtering will be required for value parameters of this type or the maximum resolution of the value parameter must be set.

CONCLUSIONS

The current disclosure demonstrates the use of a simple communication method by injecting low frequency sinusoidal components on a DC microgrid voltage rail. Through only software modifications and the provided method, low-level communication can be effectively achieved by creating an application specific protocol catered to the site of deployment. The ability of channel separation, addressability, and feedback were also assessed for more customized control. Finally, this was demonstrated on a live-scale DC microgrid with actual converters and digital control.

For most systems, commands will be comprised of few parameters and, likewise, parameters will not contain many sub-parameters. This method does not replace dedicated communication lines with either copper or fiber—in other words, communication methods designed for large throughput—but rather allows global or semi-global system parameters to easily be modified. Parameters of interest in a DC microgrid would be setting maximum current consumption or output (for renewables), desired levels of state of charge (SOC) for CDs with grid storage, and better utilization of renewables.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A low-level unidirectional global communication method for DC microgrids comprising:
   injecting at least one sinusoidal component into DC microgrid power lines;
   relating at least one parameter and at least one command with frequency components;
   including at least one communication structure for at least one communication protocol;
   providing a detection method for detecting the at least one injected sinusoidal component; and
   all without requiring hardware modification to the DC microgrid; and
   wherein a frequency range of the at least one sinusoidal component is rejected by a converter engaged with the DC microgrid power lines.

2. The method of claim 1, further comprising adding encoding and decoding software.

3. The method of claim 1, wherein the at least one sinusoidal component encodes information in spectra of the at least one sinusoidal component.

4. The method of claim 3, wherein amplitude of the at least one sinusoidal component is detected by connected devices engaged with the DC microgrid power lines.

5. The method of claim 1, wherein the method functions in extremely low and super low frequency bands and below.

6. The method of claim 1, wherein communication is unidirectional.

7. The method of claim 1, wherein detection of the at least one sinusoidal component occurs via a second order generalized integrator phase locked loop in conjunction with at least one infinite impulse response bandpass filter.

8. The method of claim 1, wherein latency is 50-500 ms and/or 2-20 cps.

9. The method of claim 1, further comprising channel separation to expand a number of commands.

10. The method of claim 9, wherein channel separation is achieved via a multi-level voltage structure.

11. The method of claim 9, wherein commands may be either layered or packet-based.

12. The method of claim 1 further comprising a single tone detection method.

13. A low-level unidirectional global communication method for DC microgrids comprising:
    injecting at least one sinusoidal component into DC microgrid power lines;
    relating at least one parameter and at least one command with frequency components;
    including at least one communication structure for at least one communication protocol;
    providing a detection method for detecting the at least one injected sinusoidal component;
    all without requiring hardware modification to the DC microgrid; and
    further comprising channel separation to expand a number of commands.

14. A low-level unidirectional global communication method for DC microgrids comprising:
    injecting at least one sinusoidal component into DC microgrid power lines;
    relating at least one parameter and at least one command with frequency components;
    including at least one communication structure for at least one communication protocol;
    providing a detection method for detecting the at least one injected sinusoidal component;
    all without requiring hardware modification to the DC microgrid; and
    further comprising a single tone detection method.

* * * * *